(12) United States Patent
Nakagawa et al.

(10) Patent No.: US 8,134,997 B2
(45) Date of Patent: Mar. 13, 2012

(54) PREAMBLE RECEIVING APPARATUS

(75) Inventors: Takao Nakagawa, Kawasaki (JP);
Tsuyoshi Shimomura, Kawasaki (JP);
Ryusuke Kiryu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 973 days.

(21) Appl. No.: 11/702,103

(22) Filed: Feb. 5, 2007

(65) Prior Publication Data

US 2008/0062935 A1    Mar. 13, 2008

(30) Foreign Application Priority Data

Sep. 11, 2006  (JP) ................................ 2006-246049

(51) Int. Cl.
*H04J 3/06* (2006.01)
(52) U.S. Cl. ......... 370/350; 370/345; 370/503; 375/355
(58) Field of Classification Search .................. 370/335,
370/352, 350, 304, 324, 309, 320, 342, 441,
370/330, 336, 343, 345, 503–514, 329, 516–521;
725/105; 455/3.01, 403, 63.3, 703, 561,
455/450, 451, 452.1, 13.2, 502, 119, 165.2,
455/183.1, 208, 265; 375/141–145, 147–153,
375/242–253, 354–370
See application file for complete search history.

(56) References Cited

U.S. PATENT DOCUMENTS

| | | | | |
|---|---|---|---|---|
| 6,279,158 B1 * | 8/2001 | Geile et al. | ..................... | 725/126 |
| 6,567,482 B1 * | 5/2003 | Popovic' | ....................... | 375/343 |
| 7,006,587 B1 * | 2/2006 | Lewis et al. | ................... | 375/365 |
| 7,496,113 B2 * | 2/2009 | Cai et al. | ........................ | 370/474 |
| 7,613,104 B2 * | 11/2009 | Bhatt et al. | ..................... | 370/208 |
| 7,623,582 B2 * | 11/2009 | Kim et al. | ...................... | 375/260 |
| 2002/0061012 A1 * | 5/2002 | Thi et al. | ........................ | 370/352 |
| 2002/0090909 A1 * | 7/2002 | Dapper et al. | ............... | 455/3.01 |
| 2003/0224731 A1 * | 12/2003 | Yamaura et al. | ............. | 455/63.3 |
| 2007/0171889 A1 * | 7/2007 | Kwon et al. | .................. | 370/350 |

FOREIGN PATENT DOCUMENTS

| | | |
|---|---|---|
| DE | 103 41 546 A1 | 5/2005 |
| EP | 1 237319 A1 | 9/2002 |
| WO | WO 0195553 | 12/2001 |

(Continued)

OTHER PUBLICATIONS

Yang Wen, Wei Huang and Zhongpei Zhang, "CAZAC Sequence and Its Application in LTE Random Access", 2006 IEEE.*

(Continued)

*Primary Examiner* — Kent Chang
*Assistant Examiner* — San Htun
(74) *Attorney, Agent, or Firm* — Fujitsu Patent Center

(57) ABSTRACT

Provided is a preamble receiving apparatus, including: a receiving unit receiving from a transmitting apparatus a frame having a format which contains a preamble section and a margin section subsequent to the preamble section; and a reception processing unit detecting a preamble signal which is transmitted in the preamble section in the transmitting apparatus from the received frame, wherein the reception processing unit includes: a correlation processing unit which defines as a search section a time having a predetermined starting point and which is equal to or shorter than the margin section, and creates a power profile for each of divided sections through a correlating process operation related to a plurality of divided sections obtained by dividing the search section; and a coupled profile creating unit for creating a coupled power profile by coupling the power profile for each of the divided sections to each other.

18 Claims, 34 Drawing Sheets

FOREIGN PATENT DOCUMENTS

WO    WO 2006/015108 A2    2/2006

OTHER PUBLICATIONS

Ericsson: "E-Utra Random Access Preamble Design"; dated Mar. 27, 2006 XP002458183 Athens, Greece, Retrieved from the Internet: URL:http//www.3gppl.org/ftp/Specs/html-info/TDocExMtg--R1-44b--25517.htm.

European Search Report; dated Nov. 12, 2007; from EP Application No. 07 10 1696.

Ericsson, E-UTRA Random Access Preamble Design, Mar. 27-31, 2006, 12 Pages.

* cited by examiner

TDS: GUARD TIME FOR MEASURE AGAINST MULTIPATH
TGP: GUARD TIME FOR MEASURE AGAINST DELAY OF TERMINAL

FIG. 8
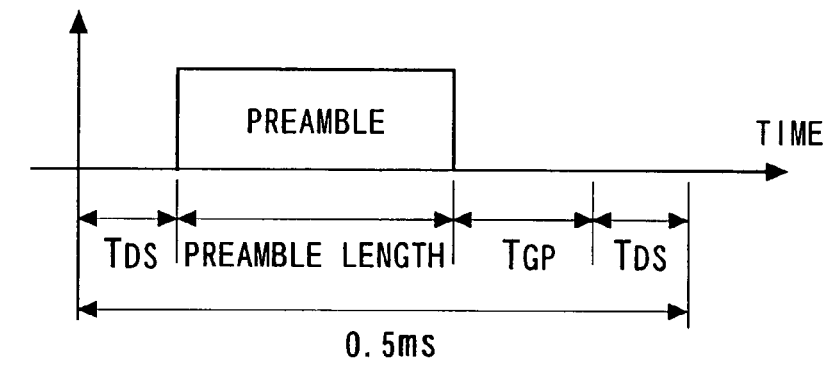
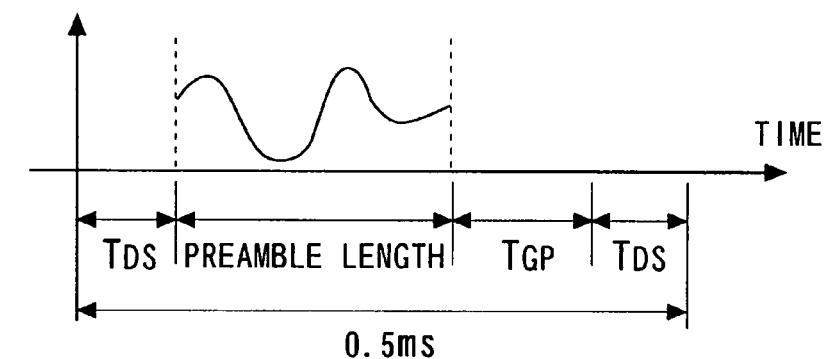
FIG. 9
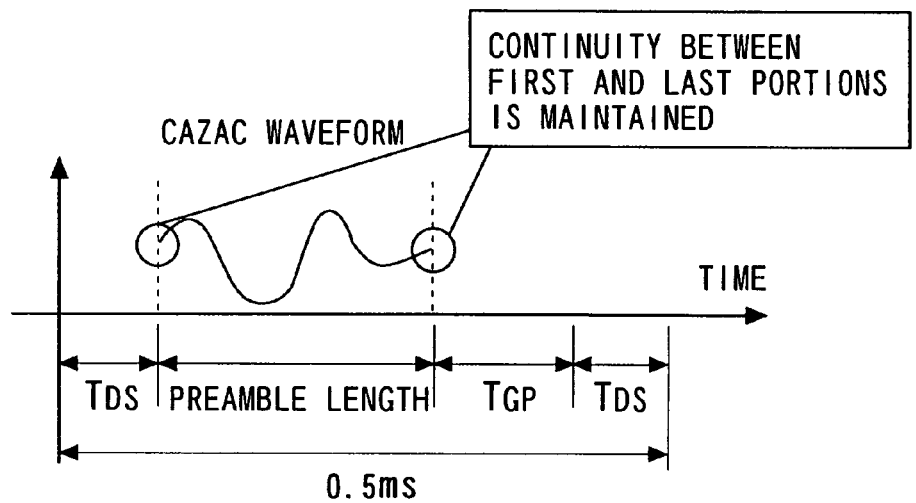

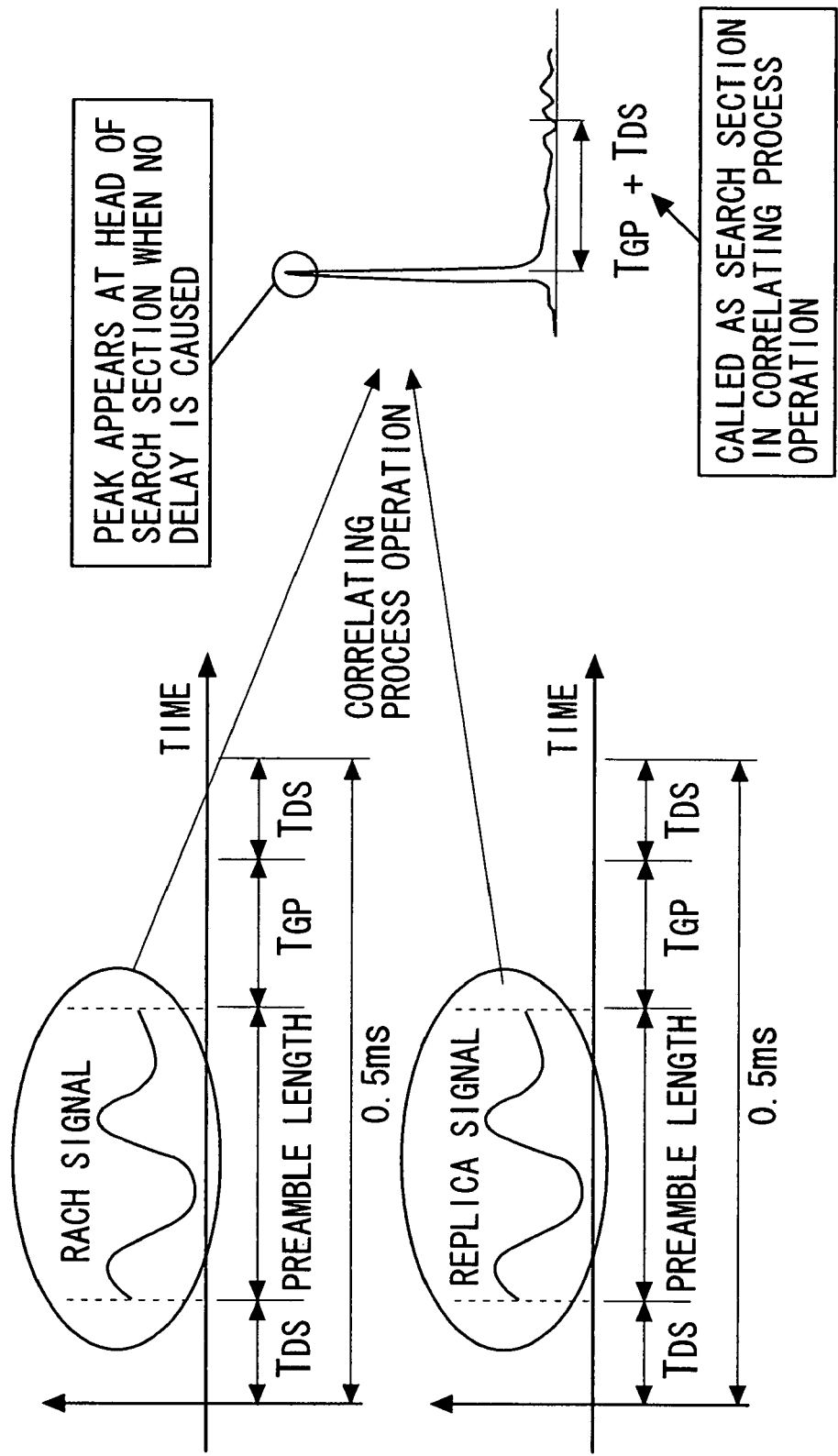

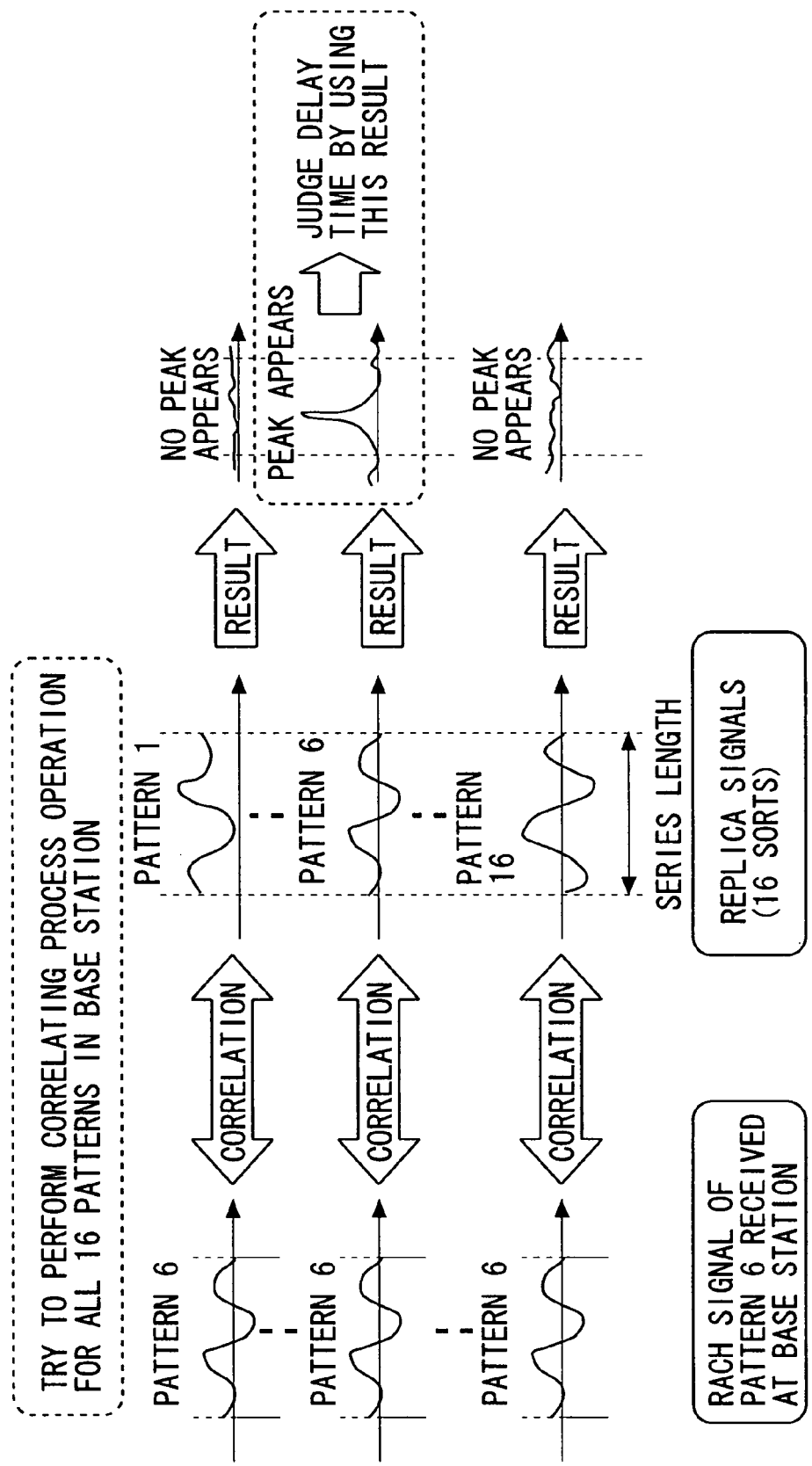

SECTION USED IN CORRELATING
PROCESS OPERATION AS PREAMBLE

PREAMBLE RECEIVING APPARATUS

BACKGROUND OF THE INVENTION

1. Field of the Invention

The present invention relates to a preamble receiving apparatus, for example, an apparatus for receiving a preamble which is transmitted by use of a random access channel (RACH) from a transmitting apparatus such as a mobile terminal.

2. Description of the Related Art

In International Standardization Meeting (3GPP), LTE (Long Term Evolution) is a next generation mobile communication standard which is presently being developed. In a case where a mobile terminal (terminal) intends to transmit information to a base station by employing an up link according to the LTE standard, the terminal performs a synchronization operation by employing a random access channel (RACH).

In the LTE standard, a communication operation is carried out while 0.5 [ms] is used as a basic unit (subframe). As a consequence, when the communication operation is carried out, the respective terminals adjust timing in accordance with an interval of 0.5 [ms]. After that, the communication operation is performed. Specifically, the terminal performs the synchronization operation with the base station the instant a power supply of the terminal is turned on, or the instant the terminal recovers from an out-of-service zone. The synchronizing method as described above is mainly divided into the following two steps.

[1] A reception timing synchronization of the terminal using such notification information as SCH (Synchronization Channel) and BCH (Broadcast Channel).

[2] A transmission timing synchronization of the terminal using a RACH. As for the reception timing synchronization of the item [1], each of a plurality of terminals located within a cell of the base station grasps the timing of a predetermined subframe interval (0.5 [ms]) determined by the base station based upon information described in both of the SCH and the BCH, which are notified by the base station to the entire cell. It should be noted that distances between the base station and the respective terminals are different for every terminal. As a result, when viewed based upon absolute times, delays corresponding to the distances of the respective terminals are produced in the timings determined by the base station (refer to FIG. 1). In fact, in a case where the base station performs only a transmission operation to the terminal by employing a down link, even when a delay is produced, it is only necessary that the terminal grasps only the subframe interval, and that the synchronization between the terminal and the base station is made at the level as described above.

Next, description is made on the transmission timing synchronization of the item [2]. In a case where the terminal intends to transmit information to the base station through the up link, a restriction on the synchronization is further added. Description is made of a RACH operation which is performed by the terminal before the terminal executes an up link transmission.

In the current LTE standard, it is required that the timings at which transmission signals from the respective terminals reach the base station are made coincident with each other at the base station. Thus, the terminal located far from the base station must transmit the signal at an earlier stage considering the delay corresponding to the distance, whereas the terminal located near the base station must transmit the signal at a later stage. In order to measure delay times at a time of transmission for the respective terminals, the RACH is employed.

Specifically, the respective terminals transmit RACH signals to the base station, the base station calculates delay amounts of the respective terminals by employing the RACH signals, and the base station sends back the calculated delay amounts to the respective terminals (refer to FIG. 2).

The respective terminals adjust transmission timings by considering the delay amounts corresponding to where the respective terminals are located. As a result, the base station can receive the transmission signals from all of the terminals at the same timing (refer to FIG. 3). The delay amounts of the respective terminals at this time are influenced by reciprocating times of the signals. This reciprocating time will be referred to as RTT (Round Trip Time).

Next, description is made on an operation through which a RACH signal transmitted from the terminal is processed at the base station. The RACH signal is transmitted in a different format from that of the normal data communication. FIG. 4 is an explanatory diagram for explaining a general format of a RACH subframe.

As a unit of a subframe, 0.5 ms is defined as one unit (TTI). The subframe has a format composed of a section "TDS", a section "Preamble", a section "TGP", and a section "TDS". The preamble section corresponds to a section for transmitting the RACH signal (preamble) used to calculate the delay time. The section "TDS" located in front of the preamble section corresponds to a margin (guard time) for preventing another signal to overlap with the RACH signal in a case where another signal outputted before the RACH signal is delayed (refer to FIG. 5). The section "TGP" subsequent to the preamble section corresponds to a margin section for compensating the delay generated due to a difference in the distances of the respective terminals.

In a terminal located immediately below the base station, since no delay is produced at all, the RACH signal having reached the base station will have the same structure as that shown FIG. 4. On the other hand, in a terminal located at an edge of the cell, since maximum delay is produced, the RACH signal transmitted from that terminal reaches the base station under a state where the RACH signal is delayed up to the last of the section "TGP". FIG. 6 indicates a RACH signal received from a terminal located at the farthest position from the base station. A value (length) of this section "TGP" is determined based upon a maximum cell radius supposed.

Further, the section "TDS" is provided after the section "TGP". This section "TDS" corresponds to a margin which is provided in order to cope with a multipath delay of the RACH signal itself (refer to FIG. 7). That is, even when the multipath delay is caused in the RACH signal transmitted from the terminal located at the farthest position from the base station, the section "TDS" functions as a guard time for properly receiving the RACH signal.

As described above, the RACH signals transmitted from the terminals have the delay times corresponding to the distances between the terminals and the base station and the multipath at a time when the RACH signals are received at the base station.

The base station calculates the delay times of the respective RACH signals by employing the RACH signals (preamble signals: hereinafter, referred to also as "preamble") received from the respective terminals. Specifically, the base station calculates the delay time by correlating the received RACH signal with a replica signal thereof.

The RACH receiving process operation is carried out as follows. When an image of the RACH signal (preamble: RACH Preamble) described up to now is correctly illustrated, the RACH signal has a waveform of a certain function as shown in FIG. 8. In general, the waveform of the RACH signal is formed by employing a specific function called "CAZAC". As shown in FIG. 9, the CAZAC waveform (CAZAC sequence) has a characteristic in that continuity is maintained through a start and end of the waveform. In a RACH correlating process operation of the RACH receiving process operation, a process using this characteristic is carried out.

In the RACH correlating process operation, correlation is calculated between the received RACH signal and the known RACH pattern (replica signal) in the base station. FIG. 10 is an explanatory diagram for explaining the RACH correlating process operation. The correlation between the received RACH signal and the replica signal is calculated, and a waveform (which is called "power profile") after the correlating process operation is created. In the power profile, a peak is detected from a predetermined temporal section (which is called "search section"). A starting point of the search section is an earliest timing at which the peak appears, which corresponds to the preamble. A length of the search section corresponds to a maximum delay time. In a case where the cell radius is maximum, the length of the search section corresponds to a margin section (namely, TGP+TDS in this example) subsequent to the preamble section. A distance between the starting position (starting point) of the search section and the peak position is calculated as the delay time.

Thus, in a case where the received RACH signal has no delay (for instance, in a case where the terminal is located immediately below the base station), a peak appears at a head (starting point) of the search section in the power profile after the correlating process operation. In contrast, in the power profile acquired from a signal which is delayed with a maximum delay time and is received from a place such as a cell edge, a peak appears in the vicinity of an ending position (end point) of the search section.

As shown in FIG. 11, as sections to be compared with each other in order to make a correlation, the preamble section (FIG. 11A) and another section (FIG. 11B) of the replica signal corresponding to the preamble section are basically employed. While the sections are illustrated by time axes in FIGS. 11A and 11B, there is also a method in which the correlation is made after the section is transformed into a frequency domain by way of discrete Fourier transform (DFT).

It should be noted that when sections are correlated with each other in a time domain, a convolution integration process operation is performed so that a process amount is increased. In contrast, when the time domain is converted into a frequency domain, the convolution integration process operation executed in the time domain can be replaced by a multiplying process operation. As a result, the process amount is decreased. The process amount of "DFT+multiplication+ IDFT (inverse discrete Fourier transform)" becomes smaller as compared with the process amount of the convolution in the time domain, so the process operation in the frequency domain is employed in many cases.

The correlating process operations shown in FIGS. 10 and 11 have been carried out based upon an assumption that the received RACH signals have no delay at all. When the received RACH signal has a delay, a problem occurs. FIG. 12 is an explanatory diagram for explaining a process operation when a delay is caused. As shown in FIG. 12A, normally, the RACH signal which is received by the base station has a delay corresponding to the distance from the terminal. As a result, a waveform of the RACH signal is shifted to a rear side of the preamble section. When the preamble section is cut out in this state, then the cut signal is brought into a state where a front half portion thereof is chipped. The cut signal as described above cannot be directly used in the correlating process operation.

In order to solve the problem as described above without changing the cutting section from the received RACH signal, a process operation shown in FIG. 12B is carried out. Specifically, a process operation (hereinafter, referred to as "overlap-and-add (OAA)") in which a signal sticking out to the margin section (TGP+TDS) provided for compensating the delays is added to the preamble section to be used in the correlating process operation from the front side thereof is carried out.

Conventionally, in the OAA, a reception content in the margin section (namely, TGP+TDS in this example) is cut out. The reception content of this cut section is overlapped with the preamble section under a state where the starting point of the reception content is made coincident with the starting point (target reception timing) of the preamble section. As a result, since the RACH signal has the CAZAC waveform, a rear portion of the added portion of the RACH signal by the OAA of the search section is continuously coupled to the head of the RACH signal received in the preamble section. The pre-process operation as described above is carried out before the correlating process operation. As a result, a continuous RACH signal of a single unit can be derived (cut out) from the cut section (preamble section).

As described above, since the OAA is carried out before the correlating process operation, the delayed RACH signals can be correlated with each other. FIG. 13 is an explanatory diagram for explaining a correlating process operation related to a delayed signal whose pre-process operation has been accomplished. A preamble section is cut out from the delayed RACH signal whose pre-process operation has been accomplished, and the cut delayed RACH signal is compared with a replica signal corresponding thereto so as to acquire a power profile. In the power profile, a portion at which the cut signal waveform coincides with the replica signal waveform appears as a peak. A difference between a position of this peak (namely, preamble reception timing) and a starting point (namely, target reception timing) of a search section is calculated as a delay time (refer to FIG. 14). The base station notifies this calculated delay time value (delay amount) to the terminal. As a consequence, the terminal can grasp the delay time, and thus, can determine the transmission timing to the base station.

Here, a description is made on both the RACH signal transmitted by the terminal and the known replica signal in the base station. In general, a CAZAC series is used as a series for generating the RACH signal. In order to form the RACH signal, several pieces of CAZAC sequences are selected to be used. At this time, in order to separate the respective CAZAC patterns from each other, the respective CAZAC patterns must be perpendicular with one another. When a series length of the CAZAC sequence becomes long, orthogonal patterns with respect to this sequence pattern is increased (refer to FIG. 15).

FIG. 16 shows an example in which 16 pieces of CAZAC patterns are used. Basically, the terminal selects one of the plurality of CAZAC patterns at random, and transmits this selected CAZAC pattern as a RACH signal (preamble). In FIG. 16, a pattern 6 is selected and transmitted.

The base station is notified of 16 patterns of the CAZAC series used in the RACH (there is another case where CAZAC series patterns are notified to the terminal through notification channel such as BCH). In the correlating process operation, replica signals of these 16 patterns are used.

FIGS. 17 and 18 are explanatory diagrams for explaining a correlating process operation performed by the base station. The base station is not notified of the CAZAC pattern contained in the received RACH signal. As a consequence, the base station performs the correlating process operation with respect to all of the CAZAC patterns (namely, 16 sorts of the CAZAC patterns in this example). When the correlating process operation is carried out between matched patterns, a peak is produced in a power profile thereof. On the contrary, a peak is not produced between patterns which are not matched with each other. As a consequence, in the example shown in FIGS. 17 and 18, a delay time can be calculated from a power profile which is obtained by performing the correlating process operation with employment of the replica signals of the pattern 6.

[Non-Patent document 1] "E-UTRA Random Access Preamble Design", Athens, Greece, Mar. 27-31, 2006, TSG-RAN WG1 #44bis, R1-060998

Noise is contained in an actual waveform of a RACH signal received by a base station. FIG. 19A is a diagram for showing an example of the RACH signal containing the noise, and FIG. 19B is a diagram for showing a case where an OAA is performed with respect to the RACH signal containing the noise. For the sake of explanation, FIGS. 19A and 19B are illustrated in such a manner that the noise is not contained in portions other than a signal transmitted to a preamble section by a terminal. However, the noise is also mixed in the RACH signal (preamble).

In the conventional OAA process operation, a process operation in which all of reception contents (namely, all of reception contents of TGP and TDS in FIG. 19B) in the margin sections subsequent to the preamble section are superimposed and added to the preamble section is carried out only once. At this time, the noise contained in the margin sections is also added to the preamble section. As a consequence, the noise is mixed in the RACH signal (preamble) received within the preamble section, thereby causing a problem in that the characteristics of the preamble are deteriorated.

An improvement in the receiving characteristics of the preamble is preferable not only in a case where the OAA process operation as described above is carried out, but also in the case where a reception side of a communication is synchronized with a transmission side thereof in a proper manner.

SUMMARY OF THE INVENTION

An object of the present invention is to provide a technique with which receiving characteristics of a preamble can be improved.

The present invention employs the following means to achieve the object described above.

According to a first aspect of the present invention, there is provided a preamble receiving apparatus, including:

a receiving unit receiving from a transmitting apparatus a frame having a format which contains a preamble section and a margin section subsequent to the preamble section; and a reception processing unit detecting a preamble signal which is transmitted in the preamble section in the transmitting apparatus from the frame received by the receiving unit, wherein the reception processing unit includes:

a correlation processing unit which defines as a search section a time having a predetermined starting point and which is equal to or shorter than the margin section, and creates a power profile for each of divided sections through a correlating process operation related to a plurality of divided sections obtained by dividing the search section; and a creating unit creating a coupled power profile by coupling the power profile for each of the divided sections to each other.

According to the first aspect of the present invention, the correlation processing unit preferably extracts a predetermined section of a time domain to be employed in the correlating process operation from the frame, converts the predetermined section into a frequency domain, performs the correlating process operation to the frequency domain, and again converts the frequency domain into the time domain to obtain the power profile.

According to the first aspect of the present invention, the reception processing unit preferably performs the correlating process operation after an overlap-and-add process operation of the divided section with respect to the section which is employed in the correlating process operation within the frame.

According to the first aspect of the present invention, there is preferably applied a configuration wherein a CP portion composed of a cyclic prefix or a cyclic postfix is added to the preamble signal;

the CP portion has a length shorter than the search section;

the search section is divided into the plurality of divided sections in consideration of the length of the CP portion; and the correlation processing unit performs the correlating process operation for each of the divided sections.

According to the first aspect of the present invention, there is preferably applied a configuration wherein:

the preamble signal is formed of a repetition of a single pattern or is added with a CP portion composed of a cyclic prefix or a cyclic postfix, the CP portion having a length longer than the search section;

the correlation processing unit performs, for each of the divided sections, the correlating process operation with respect to a first section and a second section contained in the frame to create a first power profile and a second power profile, and creates a synthesized power profile by synthesizing the first power profile and the second power profile;

the first section corresponds to a section having a position at which a timing is delayed by a length of the divided section from an earliest reception timing of the preamble signal within the frame as a starting point, and another position at which the timing is delayed from the starting point by a length of the single pattern as an end point;

the second section corresponds to a section having a starting point delayed from the starting point of the first section, and having the same length as that of the first section, and is also overlapped with the first section by the length of the divided section; and the creating unit creates the coupled power profile by coupling the synthesized power profile for each of the divided sections.

In this case, the correlation processing unit may create a synthesized power profile by adding the first power profile to the second power profile in a power addition mode. Alternatively, the correlation processing unit may create a synthesized power profile by adding the first power profile to the second power profile in an in-phase addition mode.

According to a second aspect of the present invention, there is provided a preamble receiving apparatus, including:

a receiving unit receiving from a transmitting apparatus a frame having a format which contains a preamble section and a margin section subsequent to the preamble section; and a reception processing unit detecting a preamble signal which is transmitted in the preamble section in the transmitting apparatus from the frame received by the receiving unit, the preamble signal being formed of a repetition of a single pattern or being added with a CP portion composed of a cyclic prefix or a cyclic postfix which is longer than the search section, wherein the reception processing unit includes:

a correlation processing unit creating power profiles related to a first section and a second section through a correlating process operation with respect to the first section and the second section within the frame; and a synthesizing unit creating a synthesized power profile by synthesizing the power profiles related to the first section and the second section;

the first section corresponds to a section having a position at which a timing is delayed by a length of the search section from an earliest reception timing of the preamble signal within the frame as a starting point, and another position at which the timing is delayed from the starting point by a length of the single pattern as an end point;

the second section corresponds to a section having a starting point delayed from the starting point of the first section, and having the same length as that of the first section, and is also overlapped with the first section by the length of the search section (maximum delay time length).

According to a third aspect of the present invention, there is provided a preamble reception processing method for a preamble receiving apparatus including a receiving unit for receiving from a transmitting apparatus a frame having a format which contains a preamble section and a margin section subsequent to the preamble section, and a reception processing unit for detecting a preamble signal which is transmitted in the preamble section in the transmitting apparatus from the frame received by the receiving unit, the preamble reception processing method including:

defining, by the reception processing unit, a time having a predetermined starting point and which is equal to or shorter than the margin section as a search section;

creating, by the reception processing unit, a power profile for each of divided sections through a correlating process operation of the preamble signal related to a plurality of divided sections obtained by dividing the search section;

creating, by the reception processing unit, a coupled power profile by coupling the power profile for each of the divided sections to each other; and detecting, by the reception processing unit, the preamble signal from the coupled power profile.

According to a fourth aspect of the present invention, there is provided a preamble reception processing method for a preamble receiving apparatus including a receiving unit for receiving from a transmitting apparatus a frame having a format which contains a preamble section and a margin section subsequent to the preamble section, and a reception processing unit for detecting a preamble signal which is transmitted in the preamble section in the transmitting apparatus from the frame received by the receiving unit, the preamble signal being formed of a repetition of a single pattern and being added with a CP portion composed of a cyclic prefix or a cyclic postfix which is longer than the search section, the preamble reception processing method including:

creating, by the reception processing unit, power profiles related to a first section and a second section through a correlating process operation with respect to the first section and the second section within the received frame;

creating, by the reception processing unit, a synthesized power profile by synthesizing the power profiles with respect to the first section and the second section; and detecting, by the reception processing unit, the preamble signal from the synthesized power profile, the first section corresponding to a section having a position at which a timing is delayed by a length of the search section from an earliest reception timing of the preamble signal within the frame as a starting point, and another position at which the timing is delayed from the starting point by a length of the single pattern as an end point, the second section corresponding to a section having a starting point delayed from the starting point of the first section, and having the same length as that of the first section, and is also overlapped with the first section by the length of the search section.

According to the present invention, the receiving characteristic of the preamble in the receiving apparatus can be improved. As a result, the preamble can be properly detected, the delay amount can be properly calculated, and eventually, the transmission timing control operation can be properly carried out.

BRIEF DESCRIPTION OF THE DRAWINGS

FIG. 8 is an explanatory diagram for explaining a preamble waveform of the RACH signal;

FIG. 9 is an explanatory diagram for explaining a characteristic of a preamble (CAZAC waveform);

FIG. 10 is an explanatory diagram for explaining a correlating process operation of a RACH signal having no delay;

FIG. 18 is an explanatory diagram for explaining a delay amount calculation through the correlating process operations related to a plurality of patterns;

DETAILED DESCRIPTION OF THE PREFERRED EMBODIMENT

Referring now to drawings, embodiments of the present invention will be described below. Arrangements of the embodiments are merely exemplified, and the present invention is not limited only to the structures of the embodiments.

[First Embodiment]

As a first embodiment, a description is made of a dividing overlap-and-add system (first preamble receiving system) by which when a RACH signal of a single CAZAC waveform (single pattern) sent from a terminal is received by a base station with a delay time, a power profile whose noise influence has been suppressed is obtained.

In the first embodiment, a search section (search window) for performing an overlap-and-add (OAA) process operation is divided into a plurality of divided sections (divided windows), both an OAA process operation and a correlating process operation (creation of a power profile) are carried out with respect to each of the divided sections, a coupled power profile is created by coupling power profiles related to the respective divided sections to each other, and then, a delay time is calculated based upon this coupled power profile.

Figure 1:
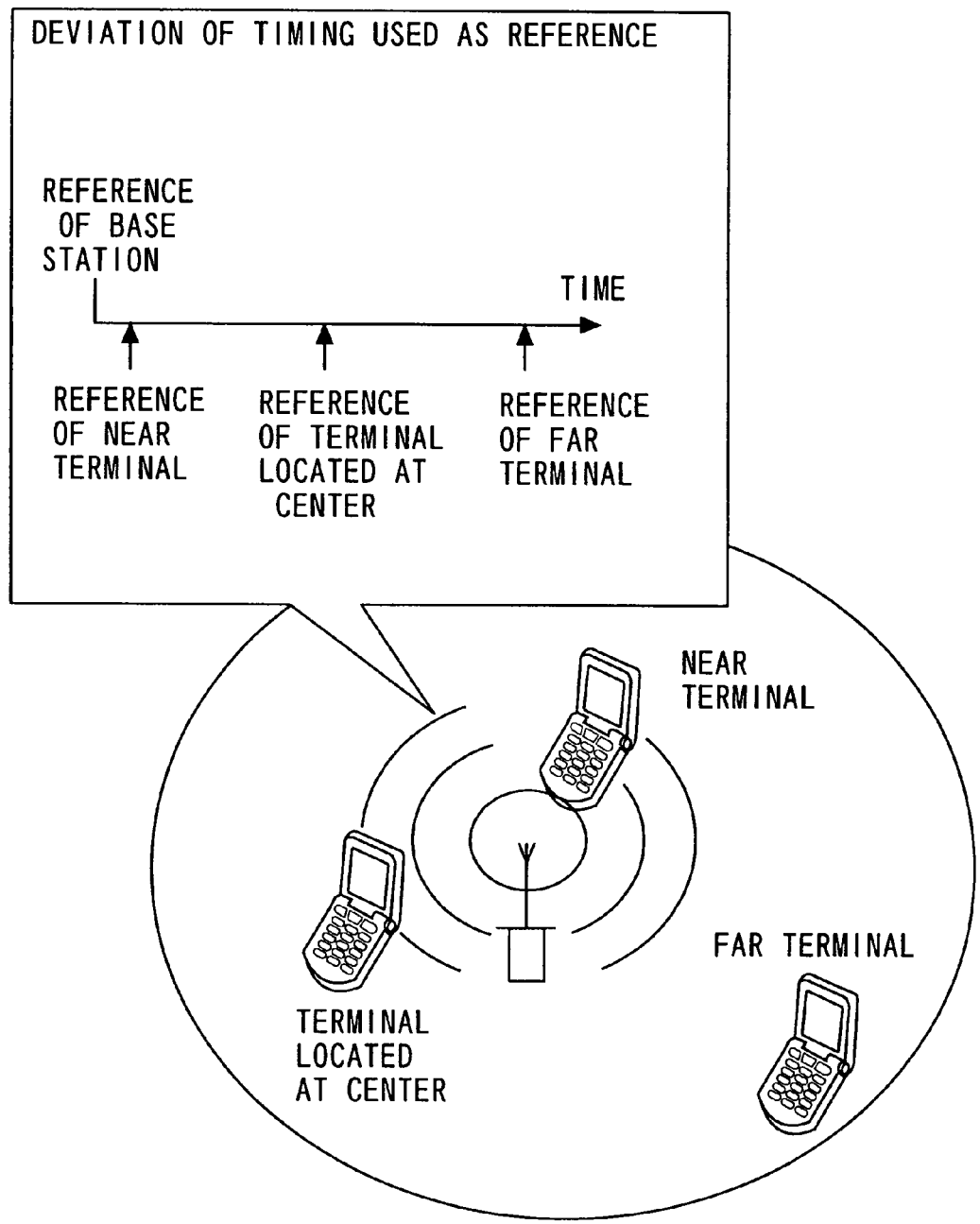
FIG. 1 is an explanatory diagram for explaining a reception timing synchronization of a terminal.
Figure 2:
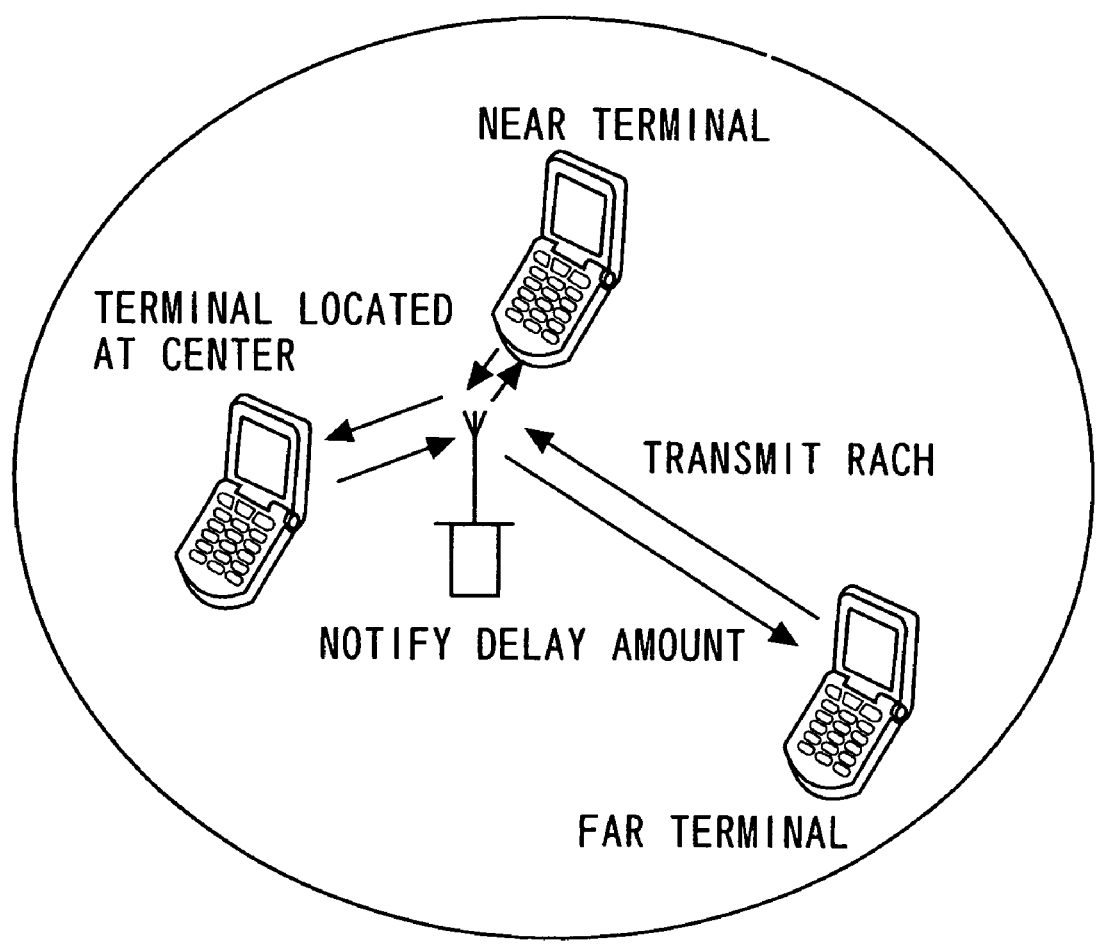
FIG. 2 is an explanatory diagram for explaining a transmission timing synchronization using a RACH of the terminal.
Figure 3:
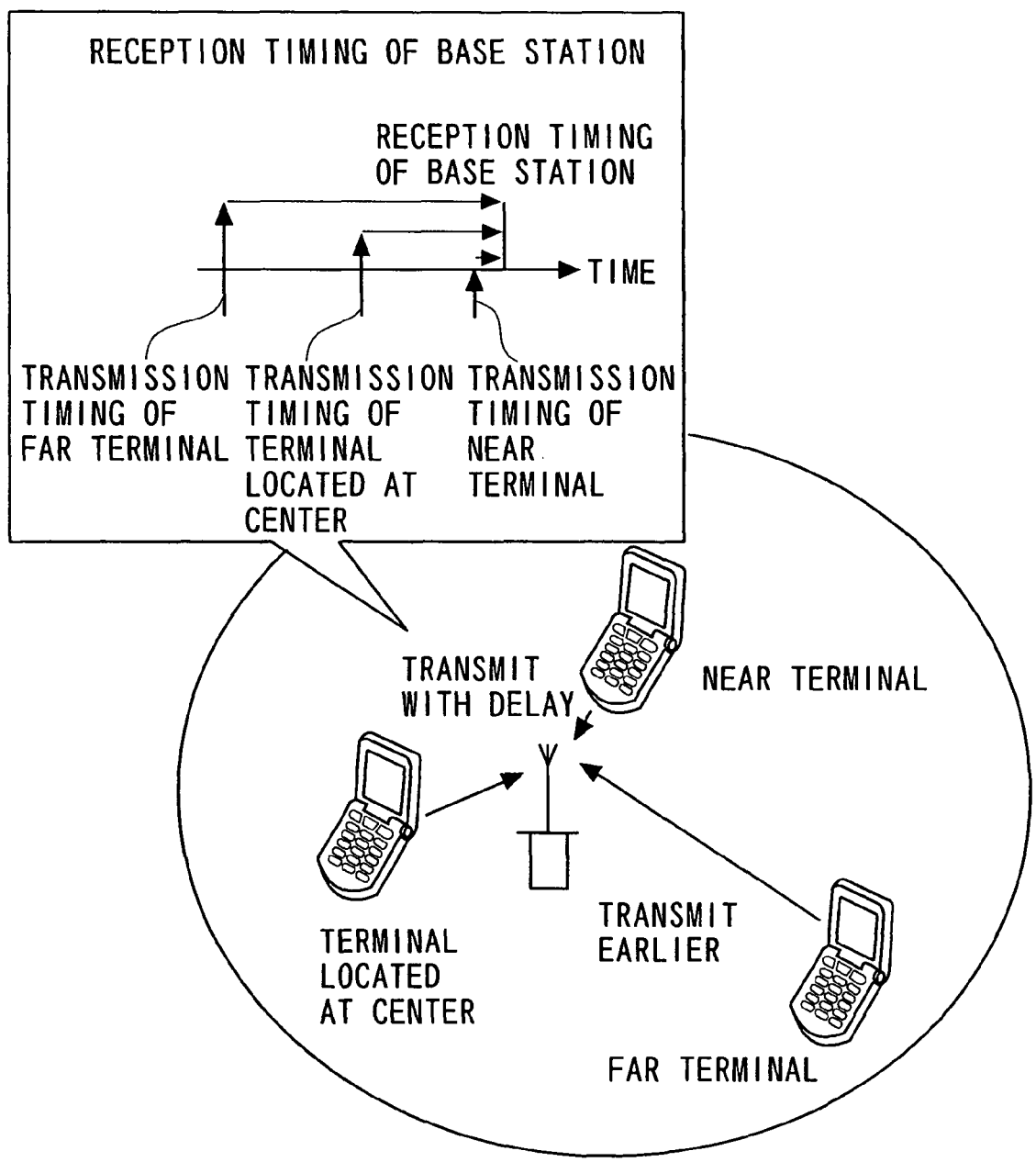
FIG. 3 is an explanatory diagram for explaining a transmission timing synchronization using the RACH of the terminal.
Figure 4:
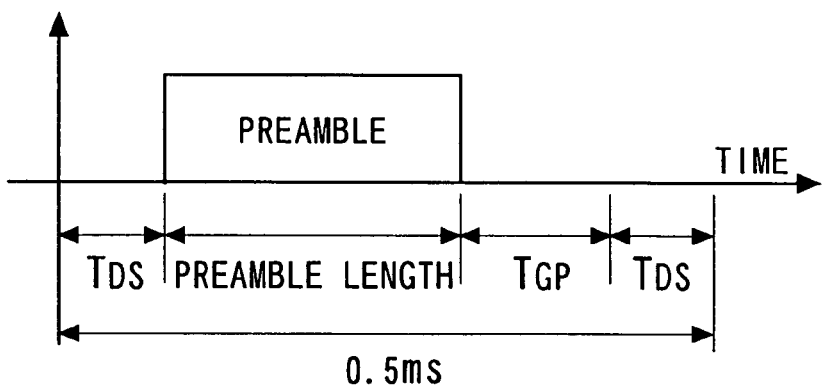
FIG. 4 is an explanatory diagram for explaining a format of a RACH signal (RACH subframe)
Figure 5:
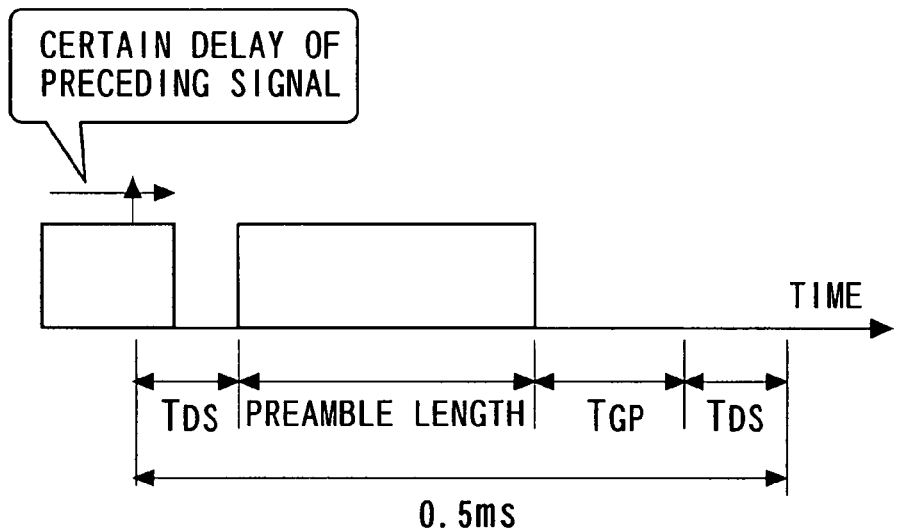
FIG. 5 is an explanatory diagram for explaining TDS of the RACH subframe.
Figure 6:
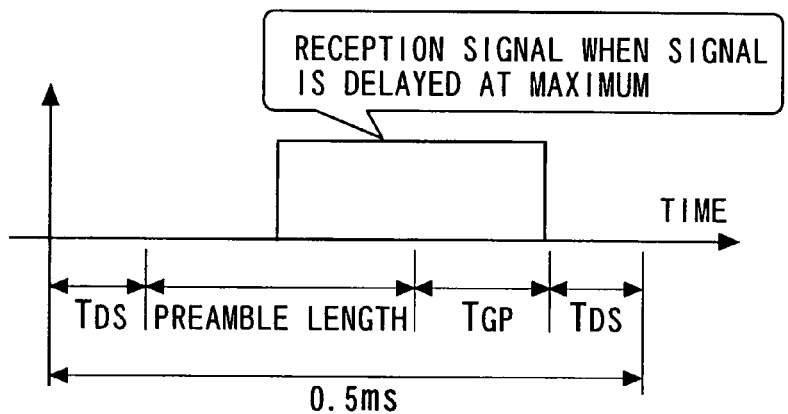
FIG. 6 is an explanatory diagram for explaining a received RACH signal delayed in maximum.
Figure 7:
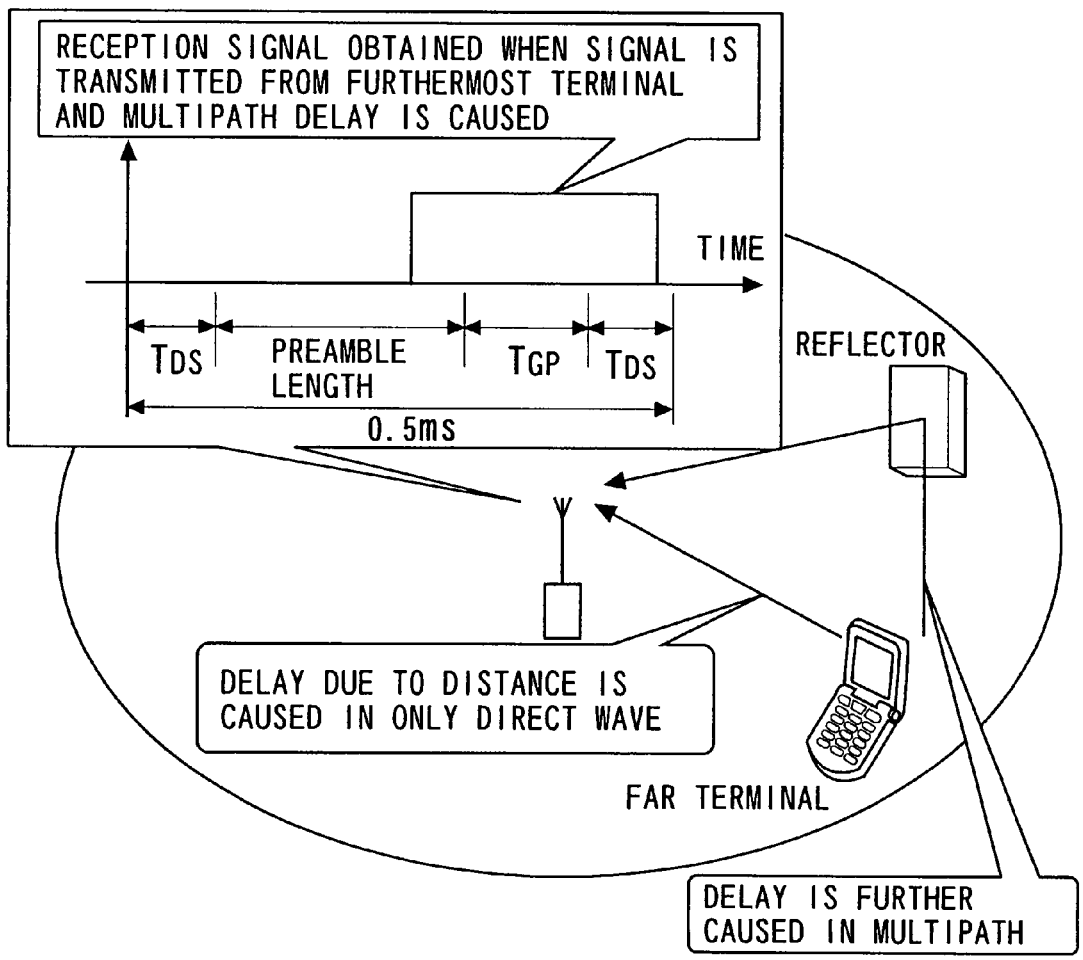
FIG. 7 is a diagram for showing a state of multipath delays.
Figure 11A:
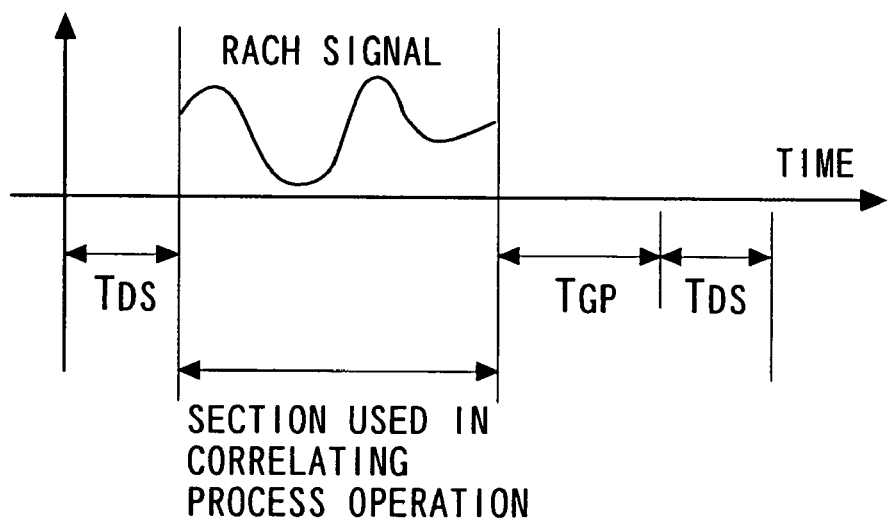
FIG. 11A is an explanatory diagram for explaining sections to be correlated within the received RACH signal.
Figure 11B:
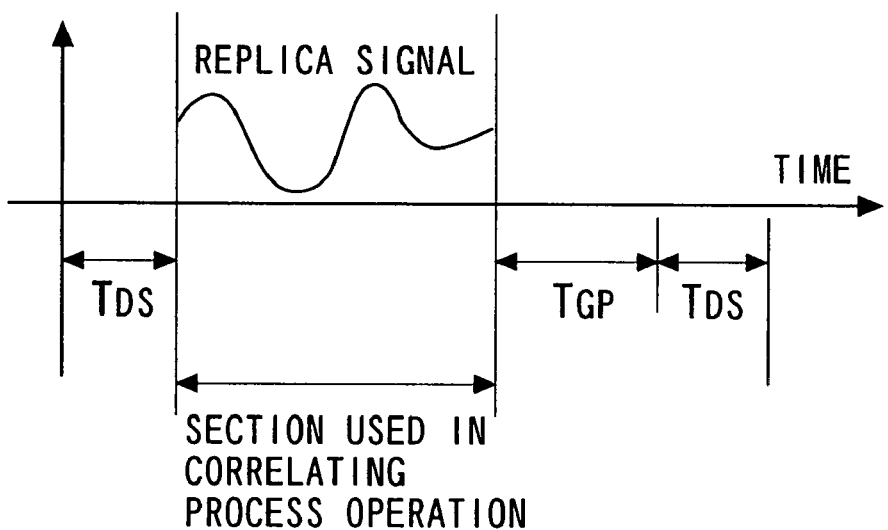
FIG. 11B is an explanatory diagram for explaining sections to be correlated in a replica signal.
Figure 12A:
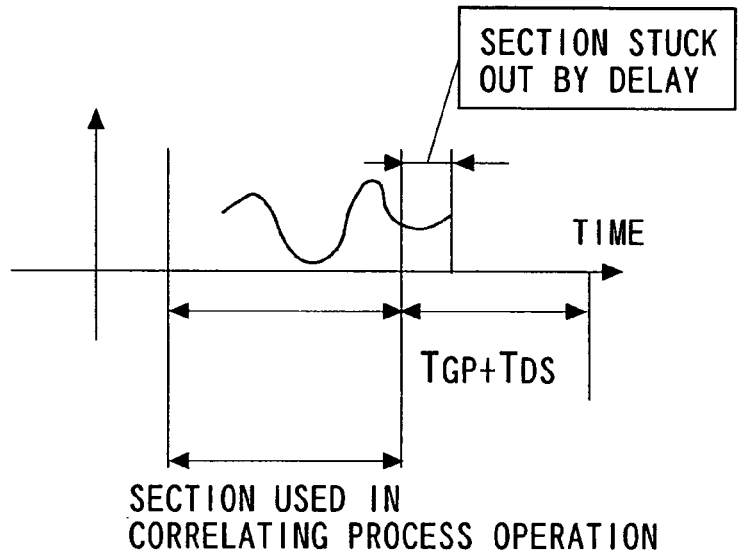
FIG. 12A is an explanatory diagram for explaining a RACH signal having a delay.
Figure 12B:
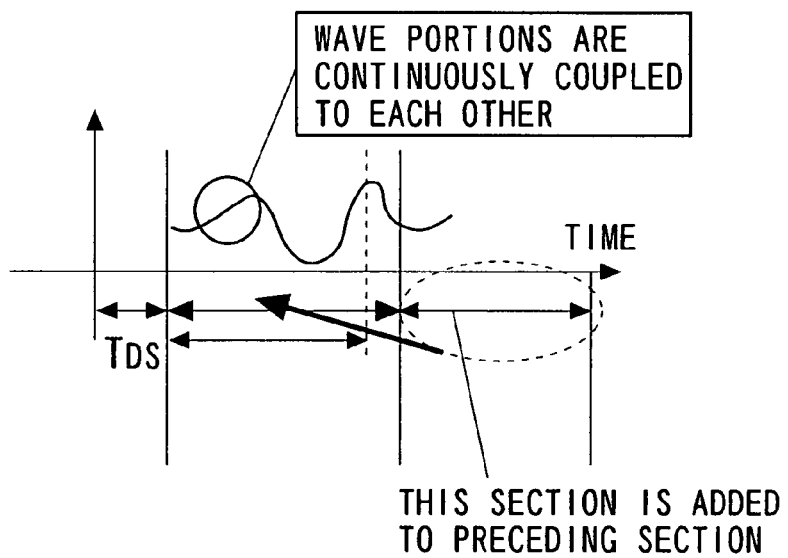
FIG. 12B is an explanatory diagram for explaining an overlap-and-add system as a pre-process of the correlating process operation.
Figure 13:
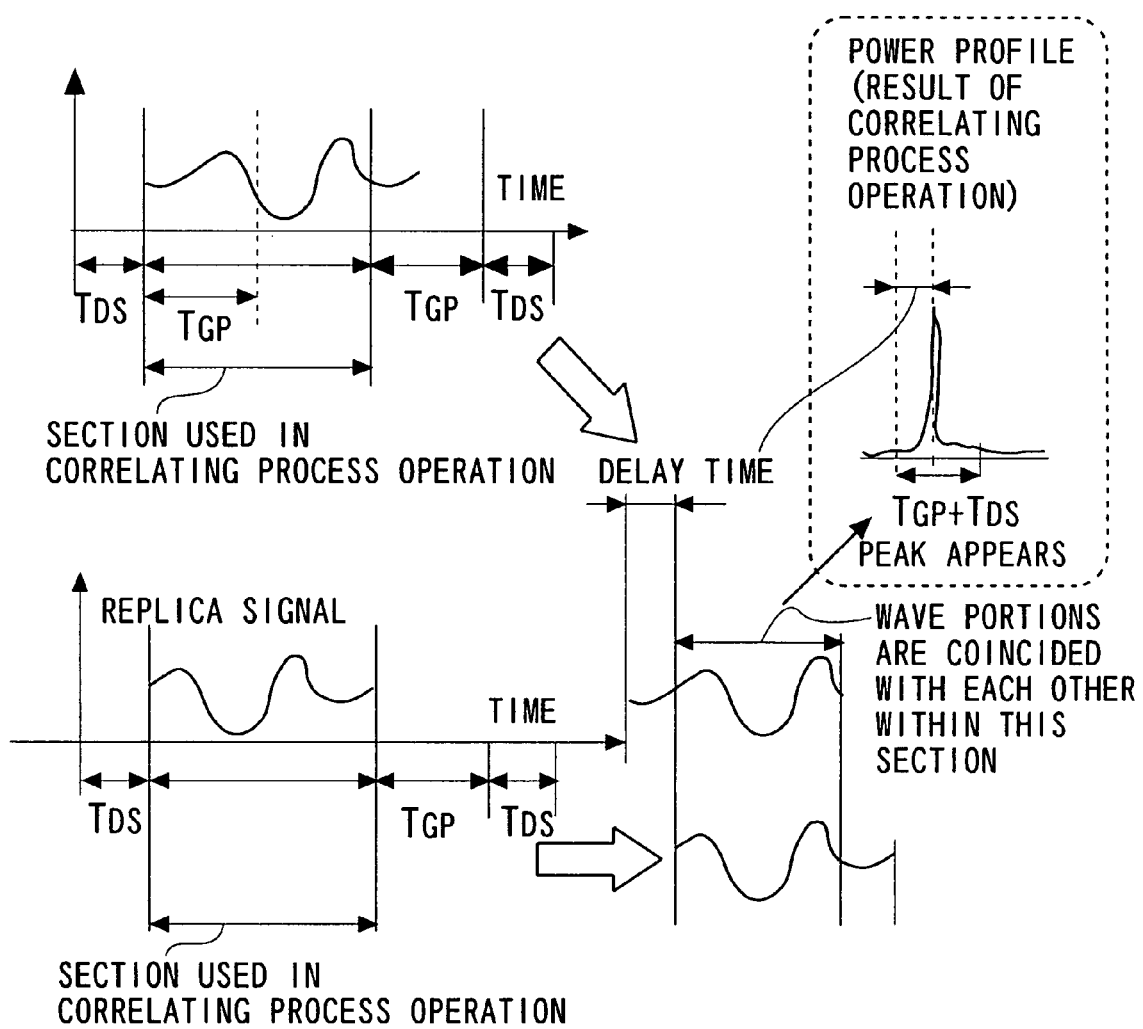
FIG. 13 is an explanatory diagram for explaining the correlating process operation with respect to a delayed signal.
Figure 14:
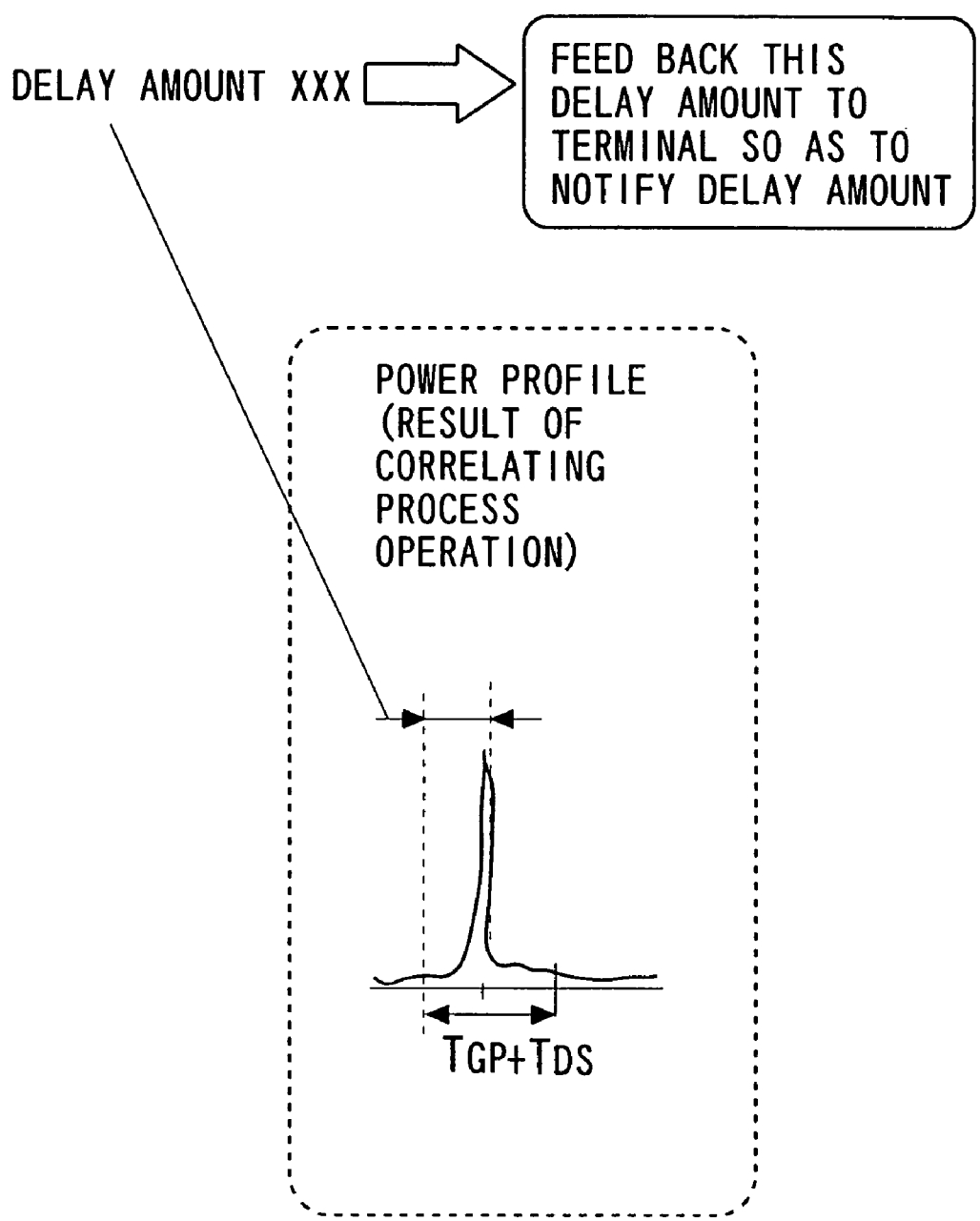
FIG. 14 is an explanatory diagram for explaining a delay amount.
Figure 15:
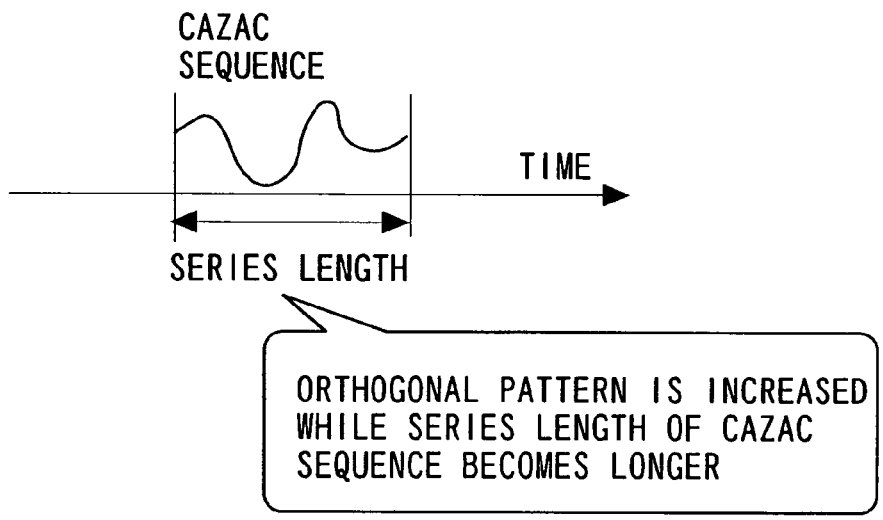
FIG. 15 is an explanatory diagram for explaining a CAZAC pattern.
Figure 16:
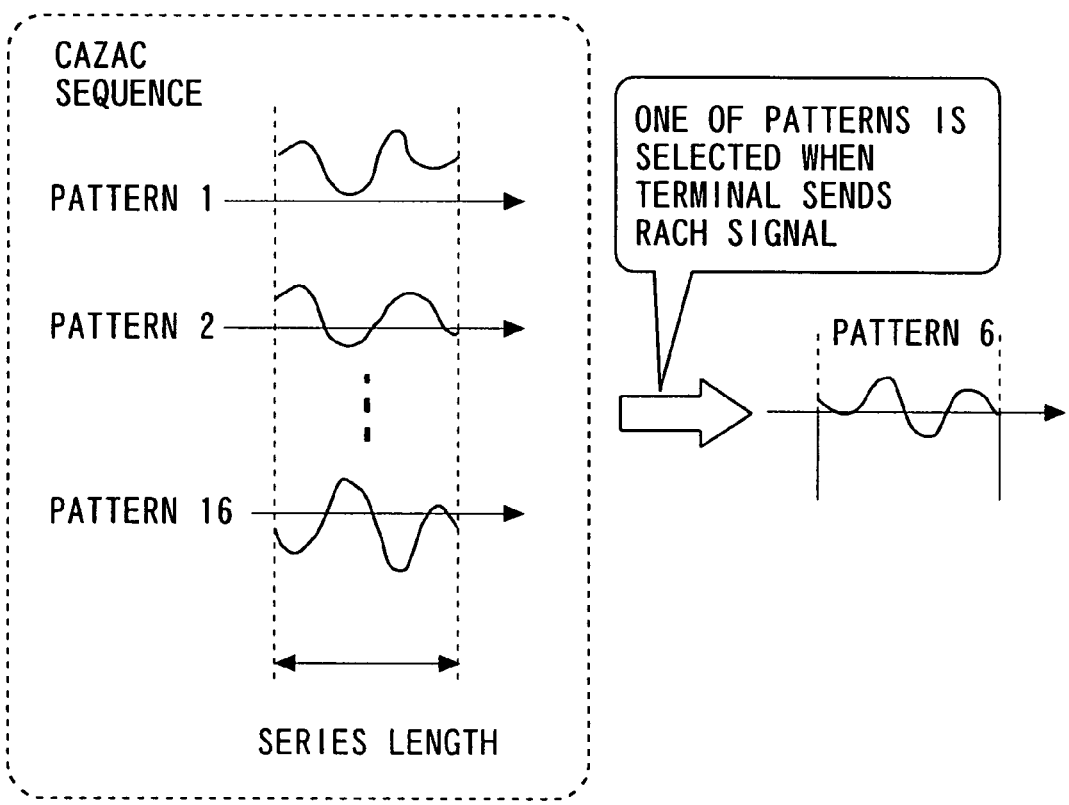
FIG. 16 is an explanatory diagram for explaining an example of the CAZAC pattern (preamble pattern) and a preamble transmission process operation by a terminal.
Figure 17:
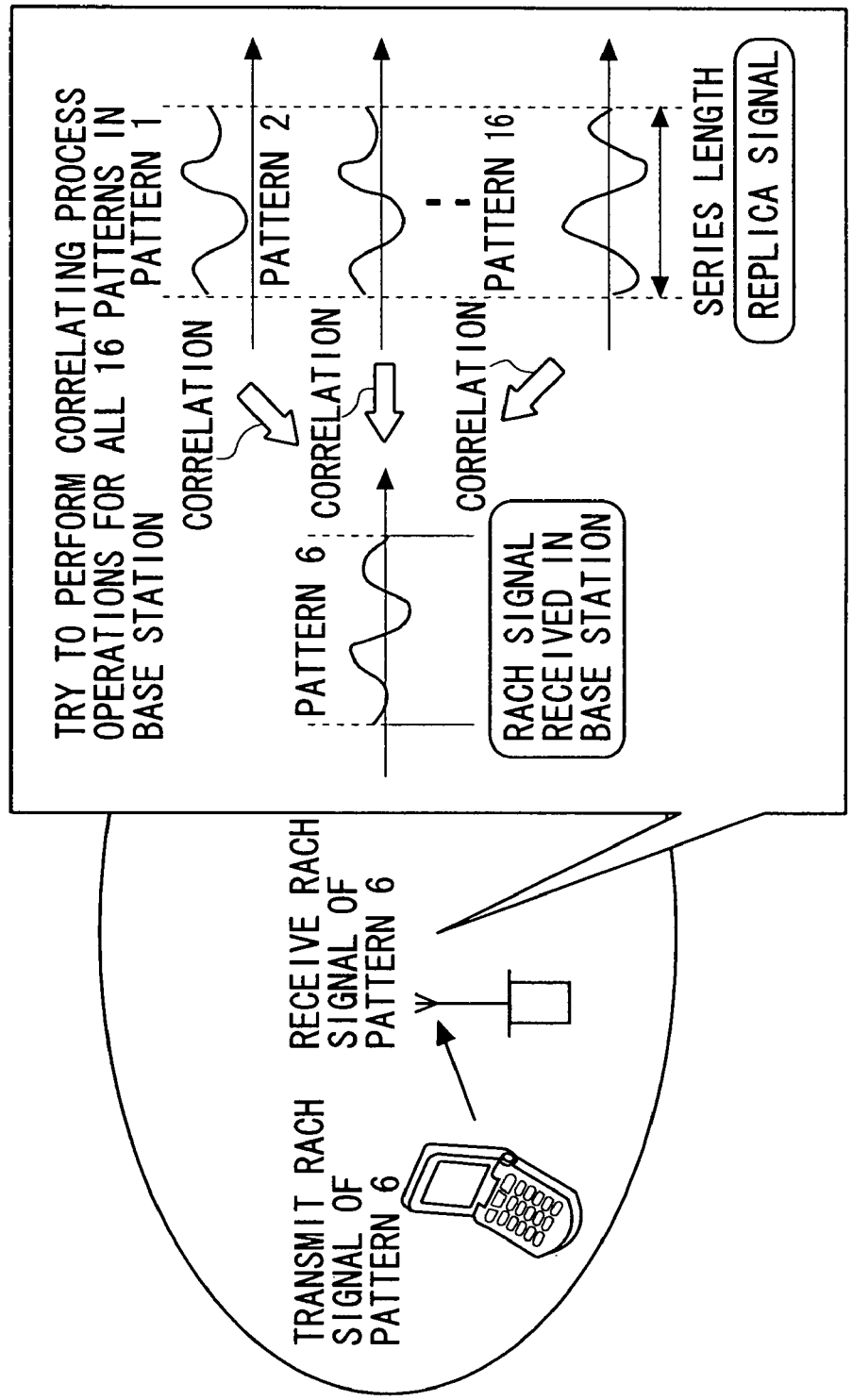
FIG. 17 is an explanatory diagram for explaining a correlating process operation executed in a base station.
Figure 19A:
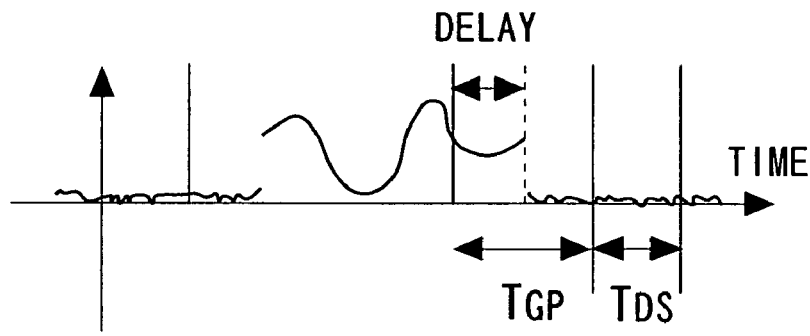
FIG. 19A is a diagram for showing a state of a RACH subframe containing noise before being subjected to an overlap-and-add process operation.
Figure 19B:
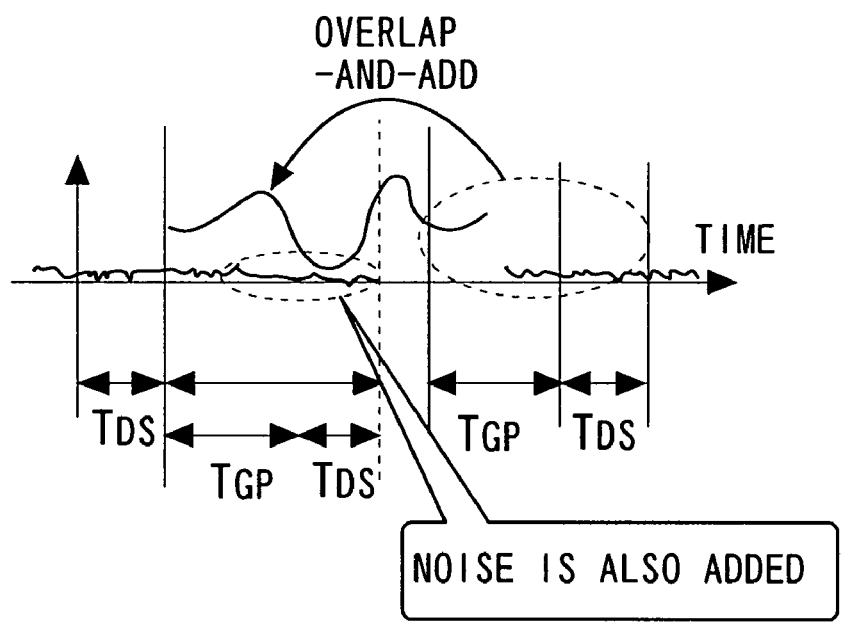
FIG. 19B is a diagram for showing a state of the RACH subframe shown in FIG. 19A after being subjected to the overlap-and-add process operation.
Figure 20A:
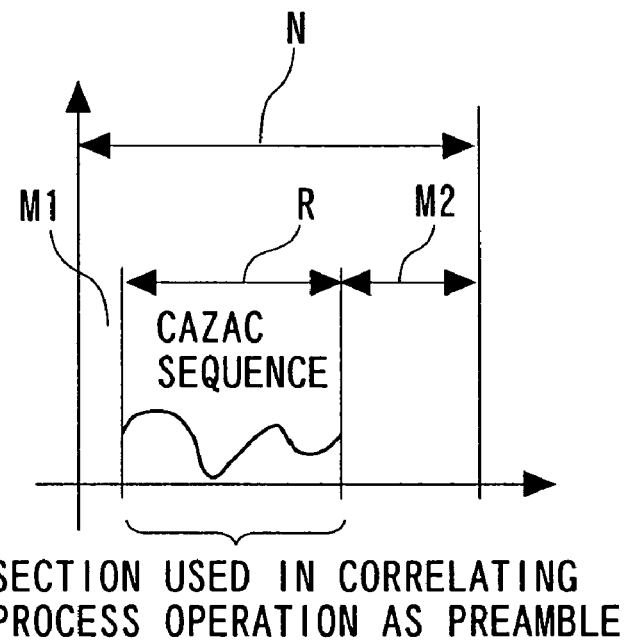
FIG. 20A is a diagram for showing a waveform of a RACH signal at a time of transmission of the RACH signal by a terminal, which is used in a first preamble receiving system according to a first embodiment of the present invention.
Figure 20B:
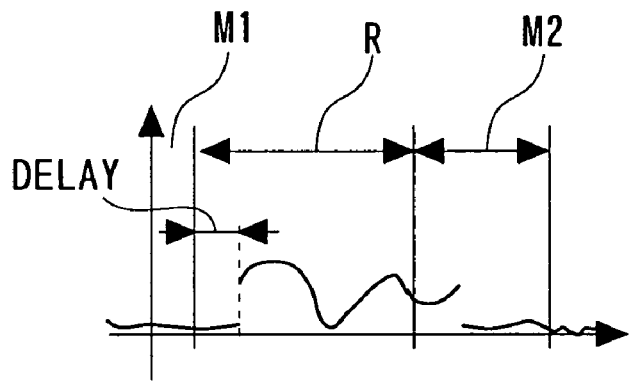
FIG. 20B is a diagram for showing a state of the RACH signal shown in FIG. 20A at a time of reception of the RACH signal by the base station.

FIG. 20A represents a RACH subframe (transmission waveform of a RACH signal) which is transmitted from a terminal, and FIG. 20B shows a reception waveform (subframe) of the RACH signal received by the base station. As shown in FIG. 20A, the RACH subframe has a predetermined length "N", and has a format which defines a margin section "M1", a preamble section "R", and another margin section "M2" from a starting point thereof.

The margin section M1 corresponds to a section TDS in a LTE standard. The preamble section R is a section during which a signal (preamble) used in a correlating process operation is transmitted, and corresponds to a preamble section in the LTE standard. The margin section M2 corresponds to margin sections TGP+TDS in the LTE standard. In the preamble section R, the terminal transmits a delay time measuring-purpose RACH signal (preamble) having a CAZAC waveform (CAZAC sequence).

When the subframe shown in FIG. 20A is received by the base station, as shown in FIG. 20B, the reception RACH signal is brought into a state of having a delay according to a distance between the terminal and the base station, and containing noise.

Figure 21:
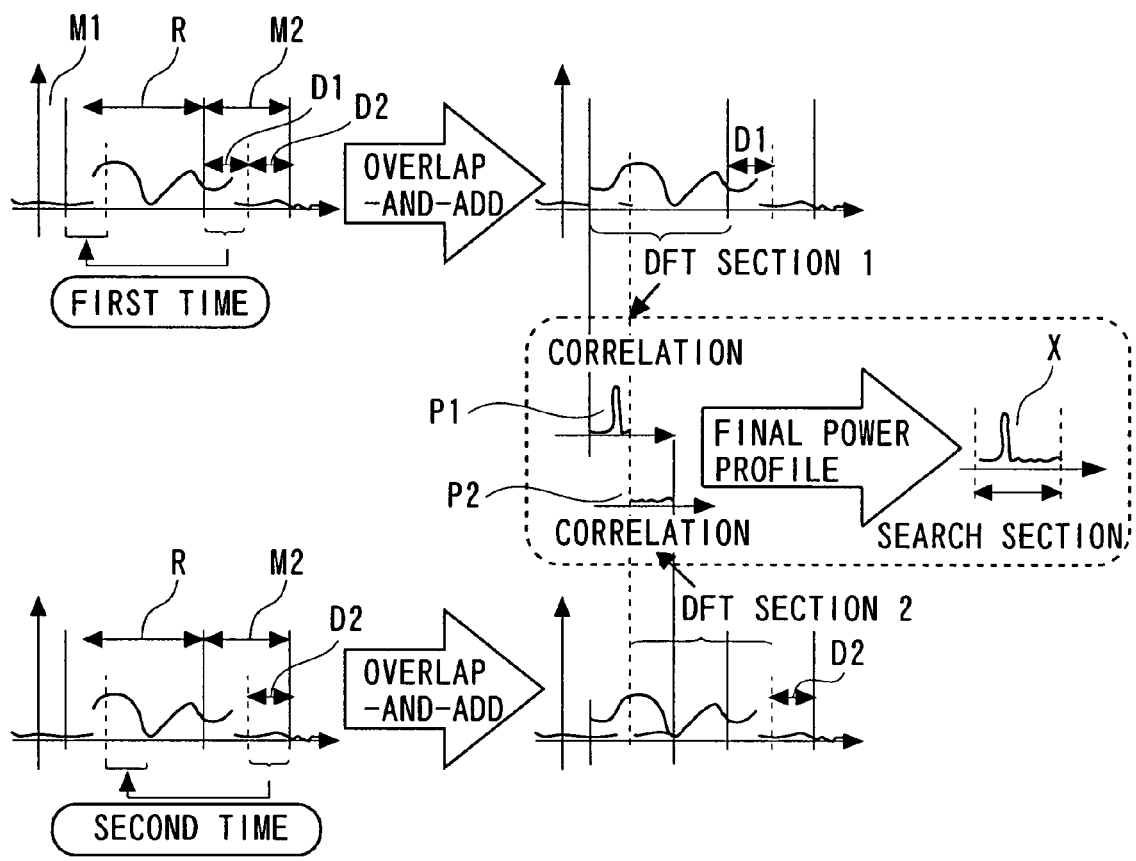
FIG. 21 is an explanatory diagram for explaining an example of the first preamble receiving system (dividing overlap-and-add system)

FIG. 21 is an explanatory diagram of processed contents of the dividing overlap-and-add system according to the present invention. For a simple explanation, in FIG. 21, a description is made of such a case that a search section is divided into two divided sections (namely, two search sections are defined). Also, while such a section has a predetermined starting point and is defined as a search section which is equal to the margin section M2, or a shorter time, both the OAA process operation and the correlating process operation are carried out every divided section obtained by dividing this search section by 2. Although the below-mentioned description explains such a case that a cell radius is maximum (margin section length=maximum delay time length), a similar explanation may be made as to such a case that a maximum delay time length is shorter than a margin section.

It should be noted that as to a total number of divided sections, any arbitrary number equal to or larger than 2 may be determined. Also, sizes of divided sections may be made equal to each other, or may be defined by mutually different sizes. Further, the dividing number (division density) per predetermined time may be arbitrarily set.

As shown in FIG. 21, in OAA and correlating process operations of a first time, a front half portion (namely, divided section "D1") obtained when the margin section "M2" is divided by 2 is overlap-and-added to the preamble section "R". Subsequently, as a section which is used in the correlating process operation, the preamble section "R" is cut out as a DFT section 1. The DFT section 1 is transformed by way of a discrete Fourier transform (DFT) into a frequency domain, and thereafter, the frequency domain is correlated with a replica signal. After that, an IDFT is performed so the frequency domain is again transformed into a time domain, and thus, a power profile is created. Thus, a power profile "P1" of the front half portion in the case where the margin section is divided by 2 is obtained.

Next, in OAA and correlating process operations of a second time, a next divided section (namely, rear half portion (divided section "D2") in the example of FIG. 21) in the margin section M2 is overlap-and-added, while a position which is shifted by the length of the divided section D1 to the rear side from the starting point of the preamble section R is defined as a starting point. Subsequently, cut out as a DFT section 2 is a section in which the position which is shifted by the length of the divided section D1 to the rear side from the starting point of the preamble section R is defined as a starting point, and a position which is advanced to the rear side from the starting point by the preamble length is defined as an end point. Then, the DFT, the correlating process operation, the IDFT, and the power profile creating operation are carried out with respect to the DFT section 2. As a result, a power profile P2 as to the rear half portion of the margin section is created.

Finally, such a process operation is carried out that two sets of these power profiles P1 and P2 are coupled to each other on the same time axis so as to form a single power profile waveform so that a coupled power profile "X" is obtained. A delay amount is calculated based upon a peak position in such a coupled power profile "X".

In the example, the description is made of a case where the dividing number (search section number) of the search section is 2. Alternatively, OAA and correlating process operations may be repeatedly carried out a plurality of times corresponding to a total division number in a method similar to the method. Finally, a coupled power profile may be created, and may be used in a delay amount calculation.

The above-mentioned dividing OAA system has the below-mentioned technical different points from those of the conventional technique:

(1) The search section (search window) is divided, and the correlating process operations are carried out a plurality of times.

(2) The cut section (DFT section) for the correlating process operation is shifted in the backward direction by the divided section utilized in the previously-executed correlating process operation. It should also be noted that the sequence for the divided sections to which the correlating process operations are carried out may be arbitrarily determined, and such a structure that the process operations related to a plurality of divided sections are carried out in a parallel manner may be employed.

<Merits of Dividing OAA System>

Figure 22:
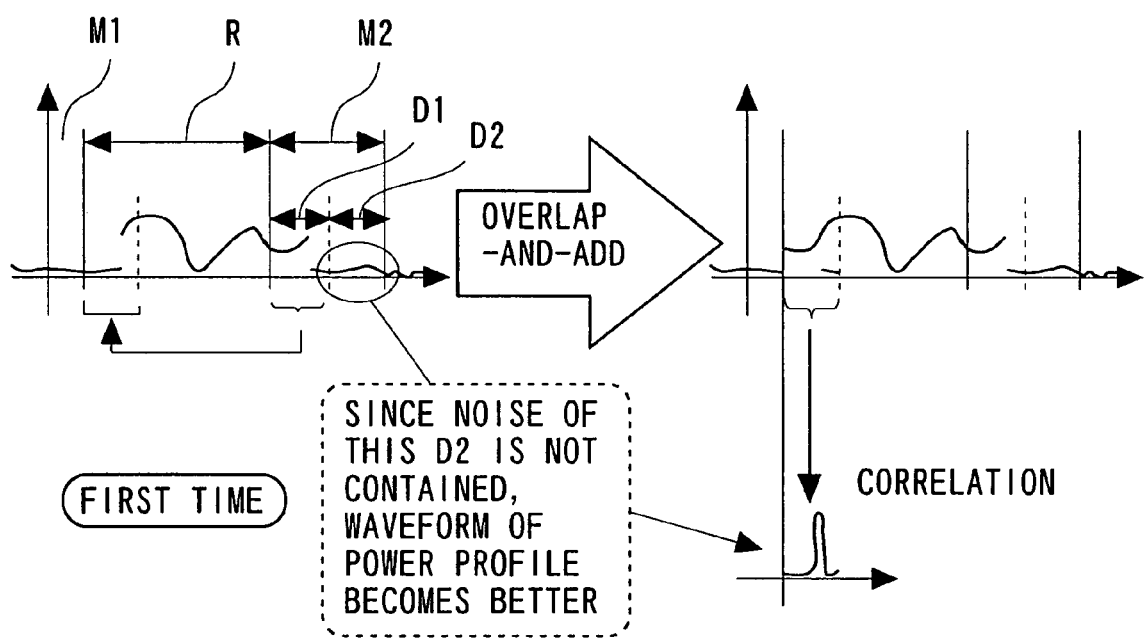
FIG. 22 is an explanatory diagram for explaining a merit of the dividing overlap-and-add system.

The dividing overlap-and-add system has the below-mentioned merits. FIG. 22 is an explanatory diagram for explaining the merits of the dividing overlap-and-add system, and represents the correlating process operation of the first time (namely, calculation with respect to a front half portion (divided section D1) of a search section) in the example shown in FIG. 21.

In the conventional technique, the overlap-and-add process operation as to the entire search section is carried out only once. In contrast thereto, in this dividing overlap-and-add system, the overlap-and-add process operation is carried out only for the front half portion of the search section. Thus, it is possible to obtain the waveform (DFT section 1) used for the correlating process operation which does not contain the noise contained in the rear half portion of the search section. As a result, the waveform of the power profile after the correlating process operation has been carried out becomes proper, as compared with that of the conventional technique.

Also, as to the calculation (correlating process operation) of the second time, similar to the correlating process operation of the first time, the power profile which is slightly influenced by the noise can be obtained. It should be noted that since no peak appears in the rear half portion (divided section D2) in the example shown in FIG. 21, the calculation of the second time has no serious meaning. However, if the delay is increased, a peak becomes apparent in the rear half portion (divided section D2). If so, the calculation of the first time has conversely no meaning.

Figure 23:
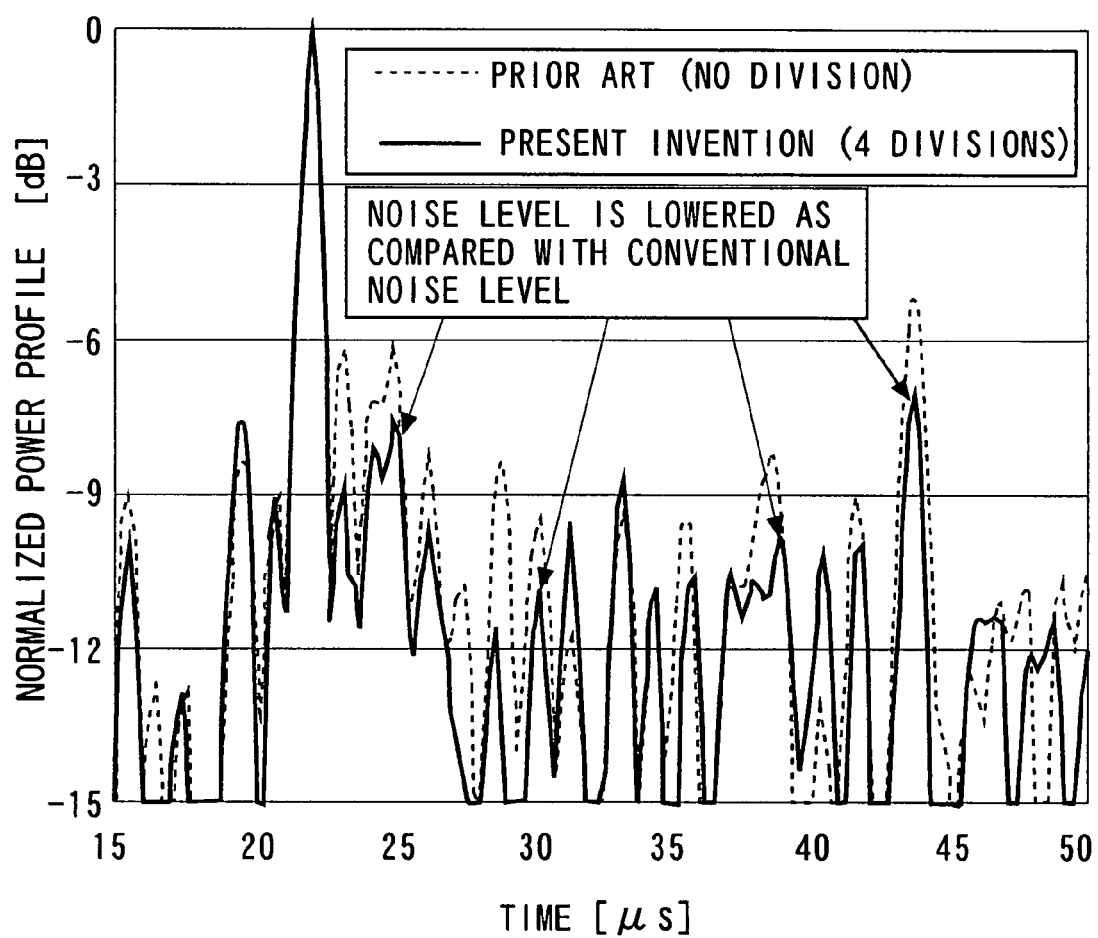
FIG. 23 is an explanatory diagram for explaining a comparison of power profiles between the prior art and the present invention (dividing overlap-and-add system)

FIG. 23 is a diagram for representing that power profiles between the conventional technique and the present invention (first embodiment) are compared with each other. An ordinate shows amplitudes of the power profiles, and is normalized by 0 [dB]. An abscissa represents a time, and indicates that a peak appears in the vicinity of 22 [μs] in FIG. 23.

The conventional technique is represented by a dotted line, and the present invention (first embodiment) is shown by a solid line. As the power profile according to the present invention, a result obtained by dividing the overlap-and-add section (search section) by 4 is represented. As shown in FIG. 23, it can be understood that a noise level is reduced in accordance with the present invention. When the present invention is applied, the receiving characteristic of the RACH signal can be improved.

<Arrangement of Base Station (Receiving Apparatus)>

Figure 24:
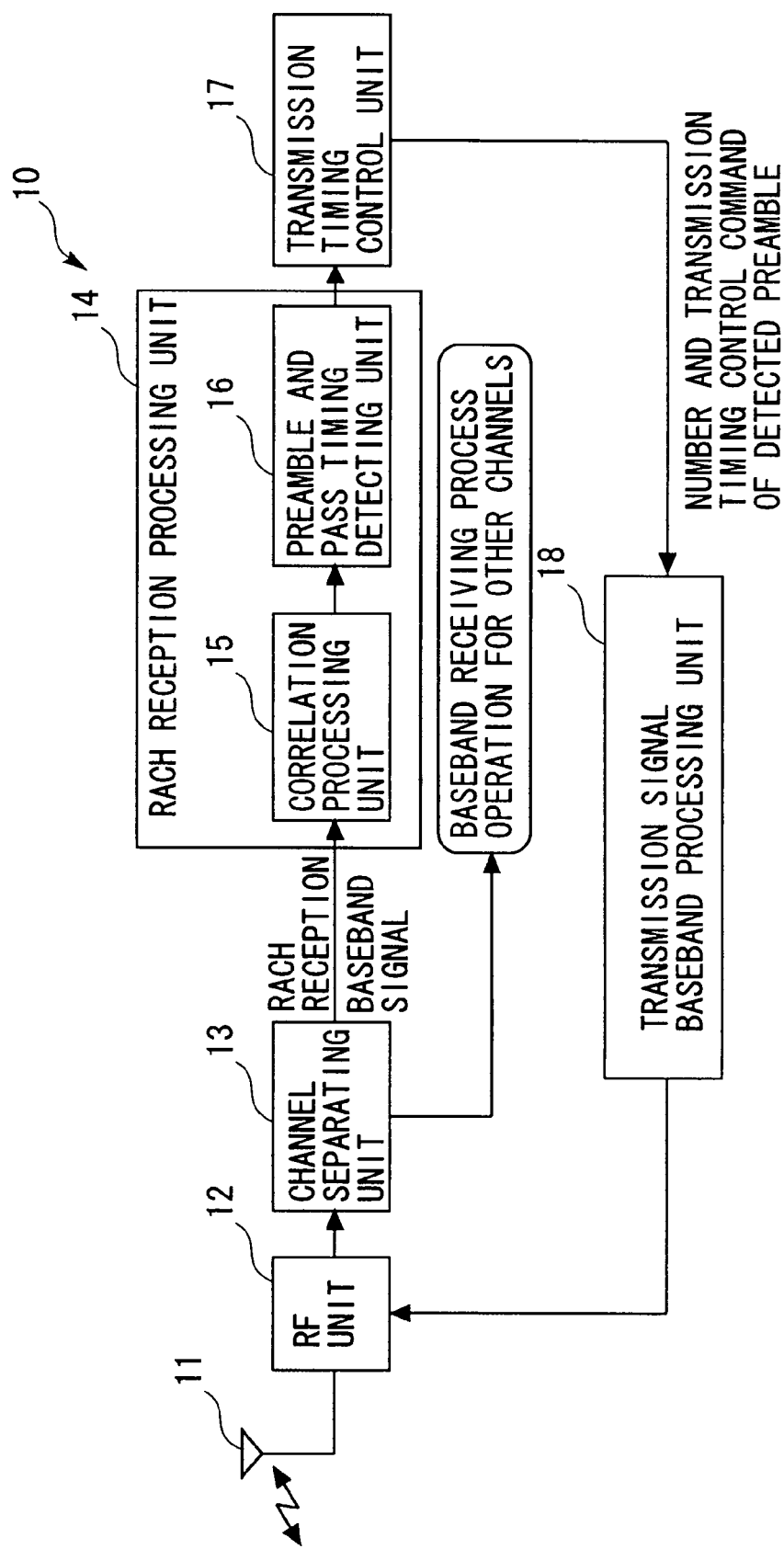
FIG. 24 is a diagram for showing a structural example of the base station (preamble receiving apparatus) to which the dividing OAA system can be applied.

FIG. 24 is a diagram for indicating a structural example of a preamble receiving apparatus according to the present invention, and for showing a structural example of a base station capable of executing the dividing OAA system according to the present invention. In FIG. 24, a base station apparatus 10 serving as the preamble receiving apparatus is equipped with a transmitting/receiving antenna 11, a radio unit (Radio Frequency processing unit: RF unit) 12 serving as a receiving unit, a channel separating unit 13, a RACH reception processing unit 14 serving as a reception processing unit, a transmission timing control unit 17, and a transmission signal baseband processing unit 18. The RACH reception processing unit 14 is provided with a correlation processing unit 15, and a preamble and pass timing detecting unit 16.

The radio unit 12 performs a transmitting/receiving process operation (including modulating/demodulating process operation of a baseband signal) of a radio signal. For instance, the radio unit 12 receives a radio signal which is transmitted from a terminal and received by the transmitting/receiving antenna 11. Then, the radio unit 12 performs amplifying/demodulating process operations with respect to the received radio signal to output a demodulated signal (baseband signal) to the channel separating unit 13.

Figure 25:
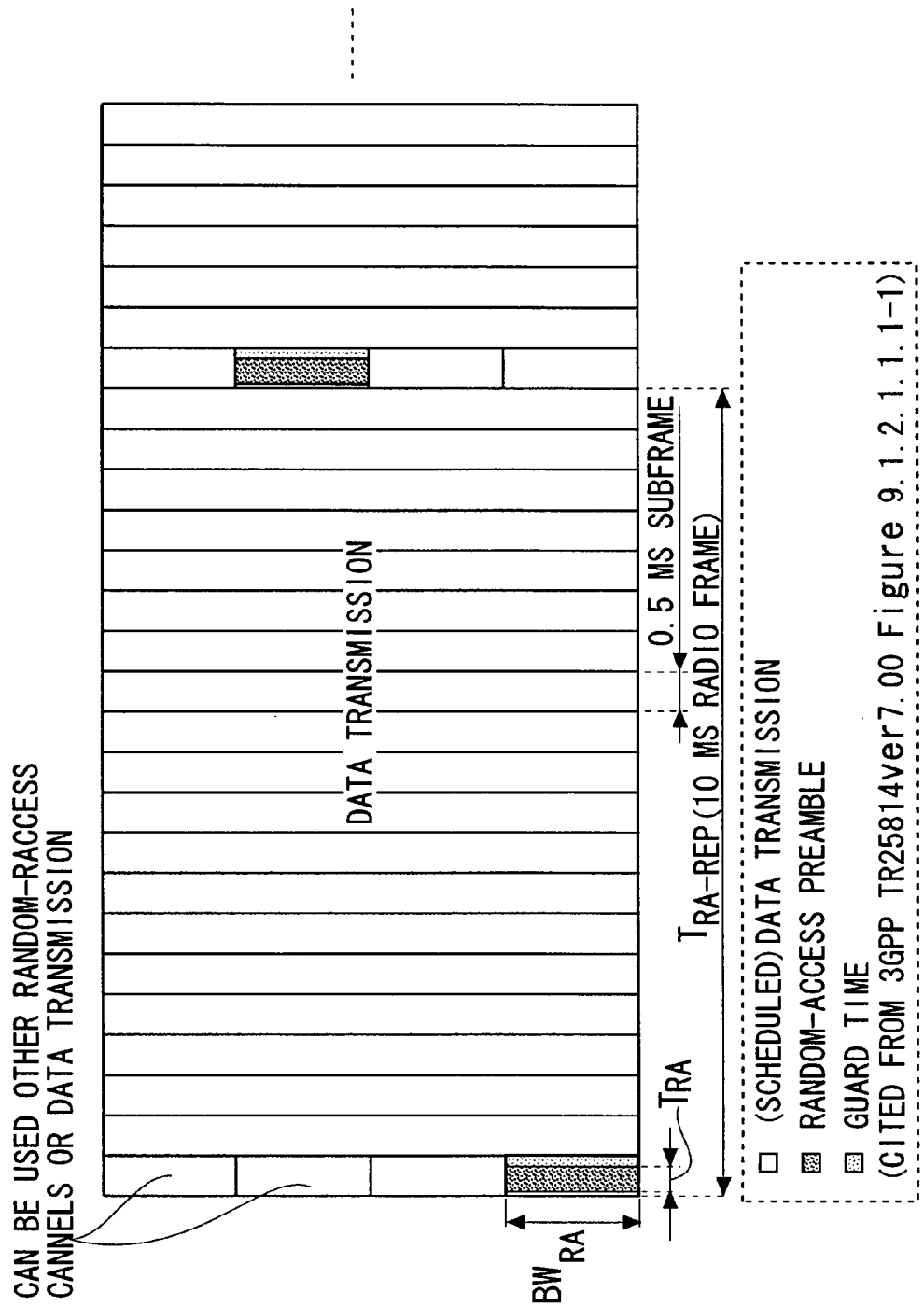
FIG. 25 is an explanatory diagram for explaining a RACH channel and other channels in a received baseband signal (frame)

The channel separating unit 13 receives such a frame as shown in FIG. 25 from the radio unit 12 as the baseband signal. The frame has been brought into such a status that a plurality of channels is multiplexed with each other in temporal and frequency aspects. The channel separating unit 13 derives a RACH subframe (RACH reception baseband signal; frame according to the present invention) from the frame, and transmits the derived RACH subframe to the RACH reception processing unit 14.

At this time, the RACH reception baseband signal (RACH subframe) has such a format as shown in FIG. 20B, and contains a delay of the preamble (RACH signal) and noise.

The correlation processing unit 15 creates a coupled power profile from the RACH reception baseband signal (RACH signal) by employing the dividing OAA system, and passes the created coupled power profile to the preamble and pass timing detecting unit 16.

The preamble and pass timing detecting unit 16 (hereinafter, referred to as "detecting unit 16") judges as to whether or not the preamble is contained in the coupled power profiled. Specifically, the detecting unit 16 detects a portion (peak) which has a predetermined power threshold value, and exceeds a power threshold value contained in the coupled power profile, as the preamble. At this time, a pattern of the detected preamble is specified. The preamble pattern is identified based upon a preamble number.

If the preamble is contained, the detecting unit 16 further calculates a difference between reception timing (timing "t0" of a detected preamble (peak)) of the preamble and target timing (starting point of a search section) so as to calculate a delay amount. The detecting unit 16 transmits both the preamble number and the delay amount to the transmission timing control unit 17.

The transmission timing control unit 17 determines transmission timing with respect to the up link of the terminal based upon the delay amount, and creates a transmission timing control command with respect to the terminal. The transmission timing control unit 17 transmits the transmission timing control command and the number of the preamble (identification number of a pattern) to the transmission signal baseband processing unit 18.

The transmission signal baseband processing unit 18 forms a transmission baseband signal containing the transmission timing control command and sends the formed transmission baseband signal to the radio unit 12. The radio unit 12 modulates and amplifies the transmission baseband signal, and transmits the resulting transmission baseband signal from the transmitting/receiving antenna 11.

The above-mentioned process operation is carried out with respect to each of the terminals which are located within the cell of the base station apparatus 10 so as to adjust the transmission timing of the up link in the respective terminals. As a result, the base station apparatus 10 can receive the information (signals) from the respective terminals at the same timing.

Figure 26:
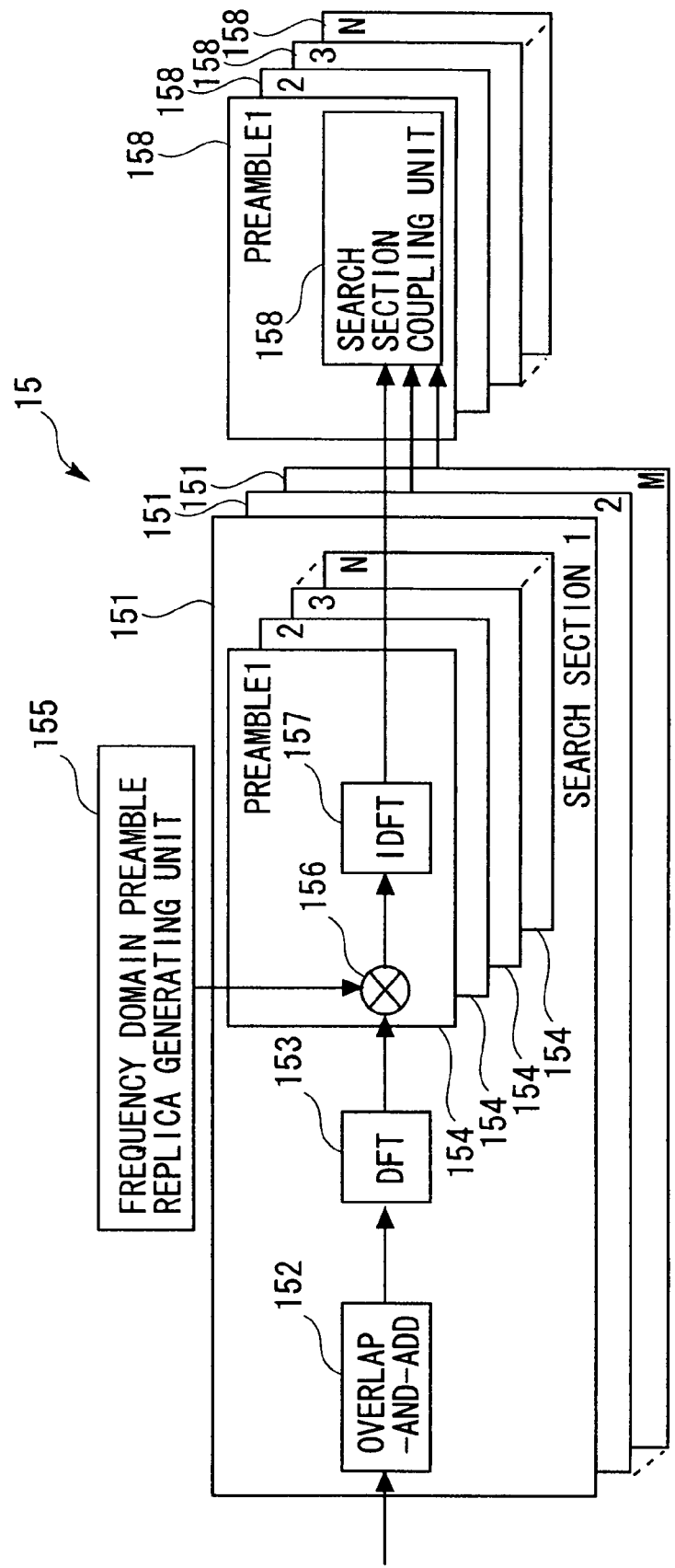
FIG. 26 is a diagram for showing a structural example of a correlation processing unit in the first embodiment.

FIG. 26 is a diagram for showing a detailed structure of the correlation processing unit 15 shown in FIG. 24, and for representing a structural example used to realize the correlating process operation (creation of a power profile) with employment of the dividing OAA system according to the first embodiment.

In FIG. 26, the correlation processing unit 15 is equipped with a plurality of power profile creating units 151, a frequency domain preamble replica generating unit 155 (hereinafter, referred to as "replica creating unit 155"), and a plurality of search section coupling units 158 (corresponding to a coupling unit of the present invention) which are prepared for each of preamble patterns (1, 2, ..., N−1, and N). The plurality of power profile creating units 151 are prepared for each of the plurality of divided sections (1, 2, ..., M−1, and M) which are defined by dividing the search section. Also, each of the power profile creating units 151 is equipped with an overlap-and-add (superimpose and addition; OAA) processing unit 152, a DFT unit 153, and a plurality of correlation calculating units 154 which are prepared for each of the preamble patterns (1, 2, ..., N−1, and N).

In each of the power profile creating units 151, the below-mentioned process operation is carried out. The RACH subframe (reception RACH signal) as shown in FIG. 20B is inputted to each of the power profile creating unit 151. The OAA processing unit 152 performs the OAA process operation as to a predetermined divided section (search section) with respect to the reception RACH signal, and then sends the processed RACH signal to the DFT unit 153. The DFT unit 153 cuts out a predetermined DFT section, performs the DFT with respect to the cut DFT section so as to be transformed into a frequency domain, and then sends the transformed frequency domain to the correlation calculating units 154.

The correlation calculating unit 154 includes a multiplier 156 and an IDFT unit 157. The multiplier 156 performs a multiplication process operation between the DFT section transformed into the frequency domain and a replica signal (one of N pieces of preamble patterns) received from the replica creating unit 155 so as to calculate a correlation between both the DFT section and the replica signal. The calculation result of the correlation is processed by IDFT in the IDFT unit 157, and then is outputted as a power profile of a time domain. As a result, a correlation processed result (power profile) with respect to the divided section is created, and this correlation processed result is sent to the search section coupling unit 158 corresponding thereto.

Each of the search section coupling units 158 is arranged in such a manner that a power profile as to the same preamble pattern (replica signal) is received from each of the power profile creating units 151. When the search section coupling unit 158 receives the power profiles related to the search sections (divided sections) 1 to M, the search section coupling unit 158 couples these power profiles to each other on the same time axis so as to create a coupled power profile. The coupled power profiles for each of the preamble patterns, which are created in the respective search section coupling units 158, are sent to the detecting unit 16.

In the detecting unit 16, the coupled power profile having a peak is extracted from the plurality of coupled power profiles received from the correlation processing unit 15 by using the method shown in FIG. 18, and a preamble number indicative of this pattern is specified.

In the structure of the correlation processing unit 15, the power profiles as to all of the preamble patterns used in the cell are required to be created. However, a length of a section (search section) for performing a frequency domain correlating process operation and a total division number of the search section may be adaptively changed according to a use application of a preamble pattern.

For instance, in the case where a preamble pattern exclusively used for a handover purpose and preamble patterns used for the other purposes are separated from each other, since a terminal which performs the handover is generally located at an edge of a cell, reception timing in a base station becomes a rear portion of a search section. In this case, as to the preamble pattern for the handover purpose, for example, the division number (division density) in the rear half portion of the search section is increased, thereby making it possible to suppress an influence by noise with respect to a coupled power profile and improve the characteristic thereof. In other words, the receiving characteristic of the preamble by the base station can be improved.

Figure 27:
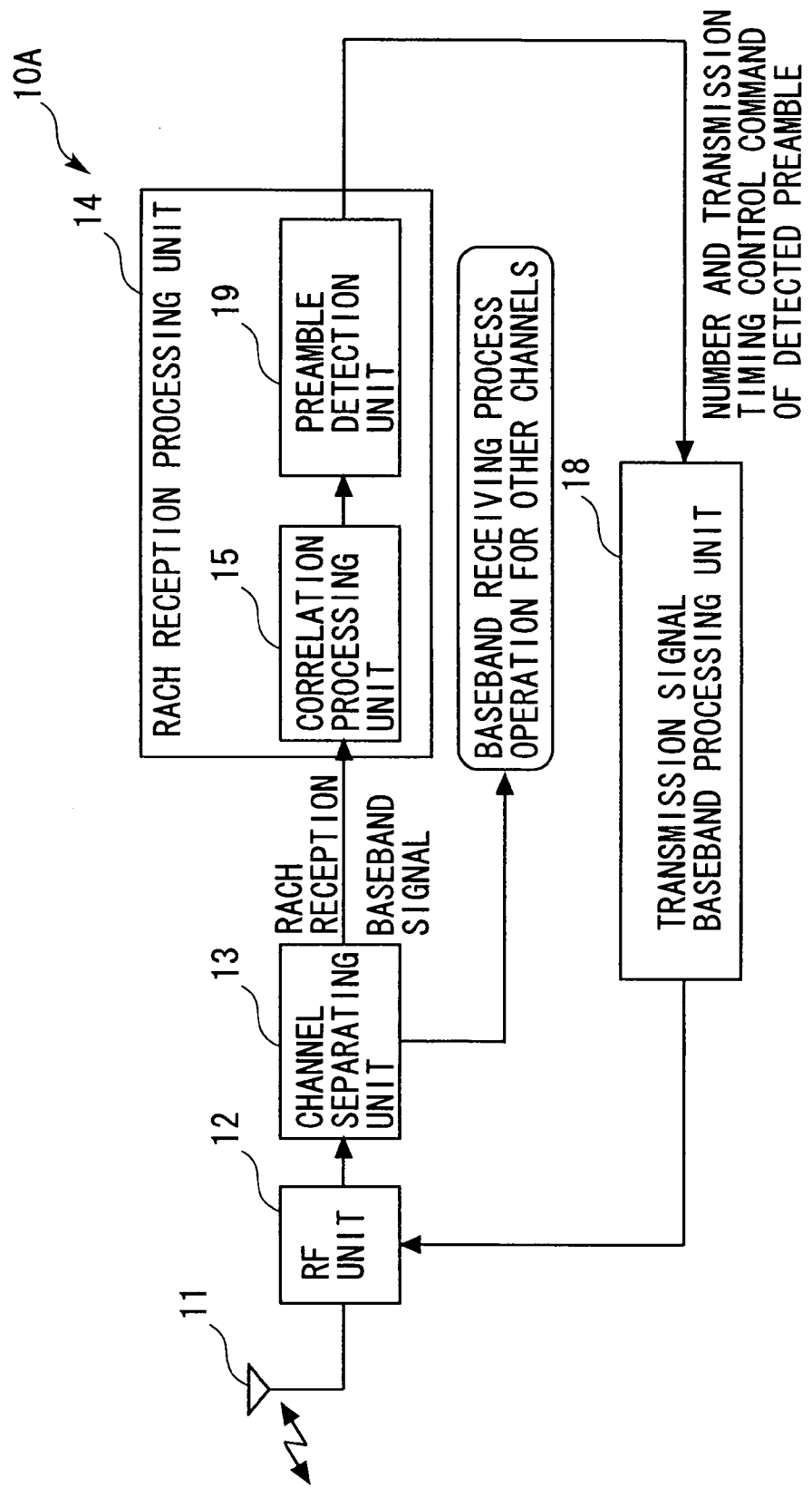
FIG. 27 is a diagram for showing another structural example of the base station to which the dividing OAA system can be applied.

FIG. 27 is a diagram for showing another structural example of a preamble receiving apparatus according to the present invention, and for indicating another structural example of a base station to which the dividing OAA system may be applied. In FIG. 27, a base station apparatus 10A serving as a preamble receiving apparatus has the below-mentioned points from the base station apparatus 10 shown in FIG. 24. That is, the RACH reception processing unit 14 is provided with a preamble detecting unit 19 instead of the detecting unit 16. Also, the transmission timing control unit 17 is omitted.

The preamble detecting unit 19 has only a function of detecting a preamble among the functions of the detecting unit 16, but does not have a structure of calculating a delay amount. Also, while the transmission timing control unit 18 is not provided, a transmission timing control command according to a delay amount is not notified to a terminal.

Except for those points, the base station apparatus 10A has a structure and a function, which are similar to those of the base station apparatus 10. The base station apparatus 10 has the transmission timing control function for the structural element for conforming to the LTE standard. It should be noted that there is a base station which performs only a process operation for detecting a preamble transmitted from a terminal, but performs a RACH process operation by which reception timing of the preamble is not detected (namely, delay amount is not calculated). The base station apparatus 10 has the structure of the base station. Also, in this case, as a power profile employed so as to detect a preamble, a coupled power profile to which the noise influence is suppressed is used. As a result, the preamble can be properly detected, and eventually, the transmission timing can be properly controlled. In other words, the receiving characteristic of the preamble can be improved.

[Second Embodiment]

Next, a second embodiment of the present invention will now be explained. Since the second embodiment has a similar structure to that of the first embodiment, different points will be mainly described, and explanations as to common points are omitted.

<CP Format>

Figure 28:
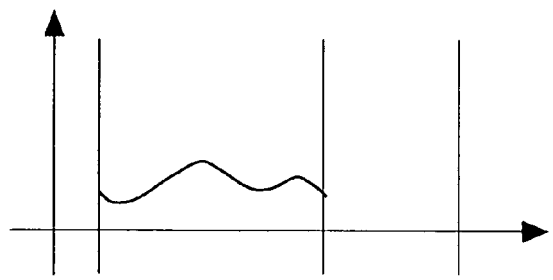
FIG. 28 is an explanatory diagram for explaining a normal RACH signal waveform without using a CP.

As the second embodiment, a description is made of a receiving system in the case where a RACH signal has a format using a CP. Symbol "CP" indicates abbreviation of either "Cyclic Prefix" or "Cyclic Postfix". FIG. 28 is a diagram for showing an example of the normal RACH signal waveform obtained without employing the CP.

Figure 29A:
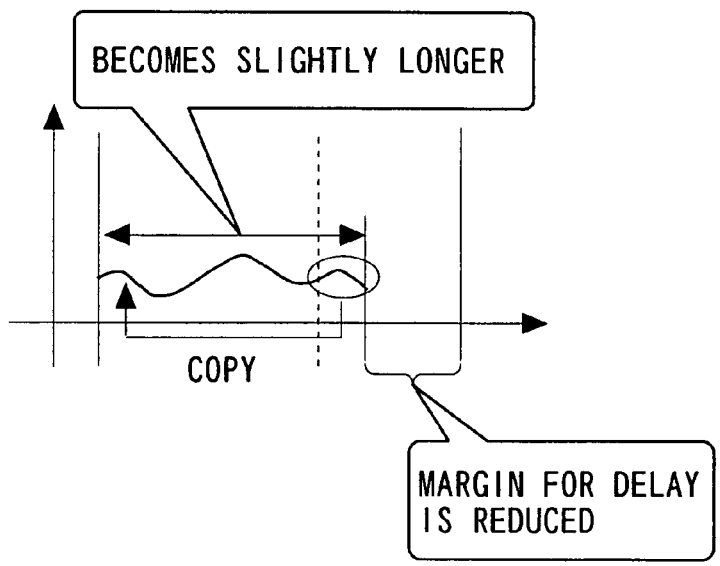
FIG. 29A is an explanatory diagram for explaining a RACH signal waveform to which a CP (cyclic prefix) has been added.
Figure 29B:
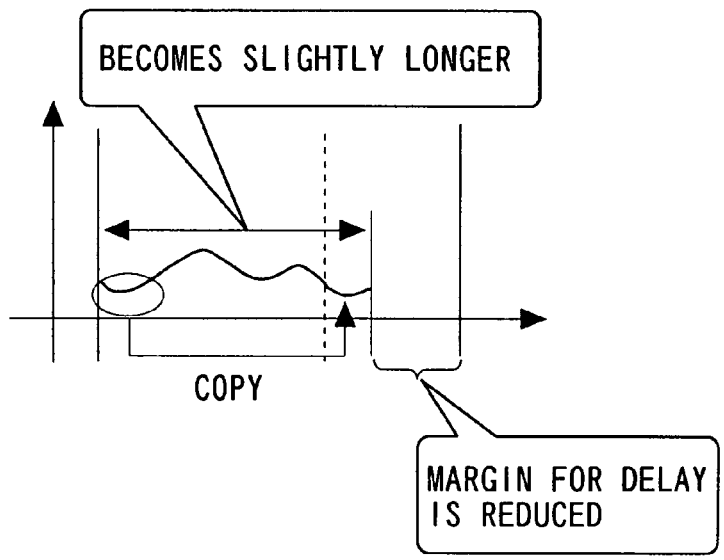
FIG. 29B is an explanatory diagram for explaining a RACH signal waveform to which a CP (cyclic postfix) has been added.
Figure 30A:
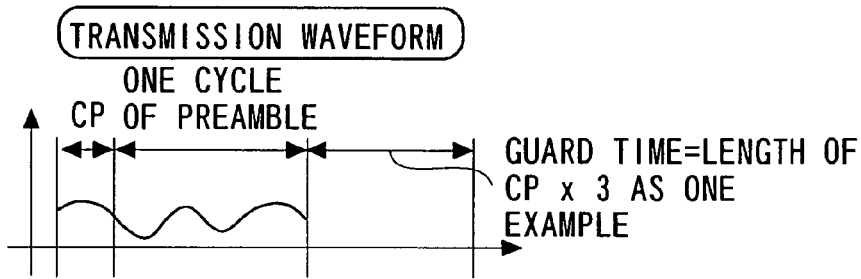
FIG. 30 is an explanatory diagram for explaining a second preamble receiving system (receiving process operation of a preamble equipped with CP) according to a second embodiment of the present invention.
Figure 30B:
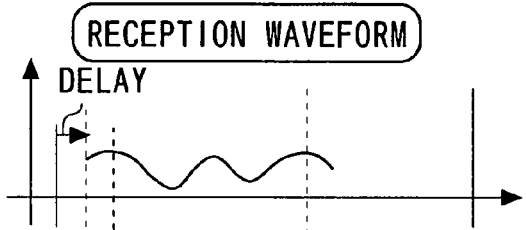
Figure 30C:
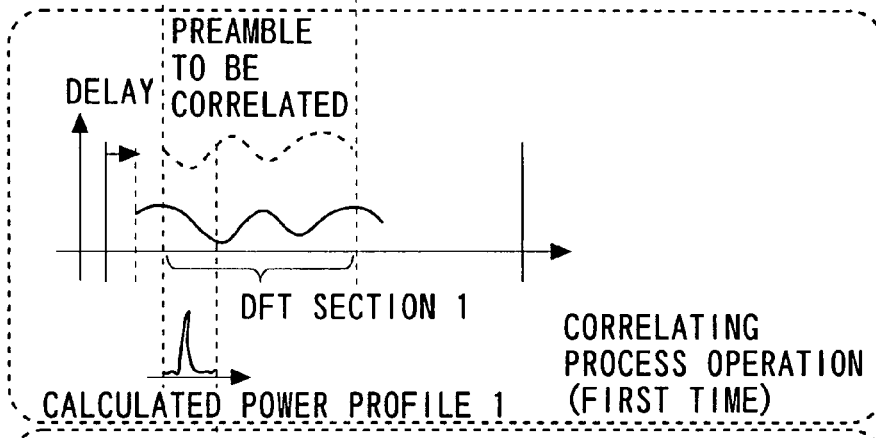
Figure 30D:
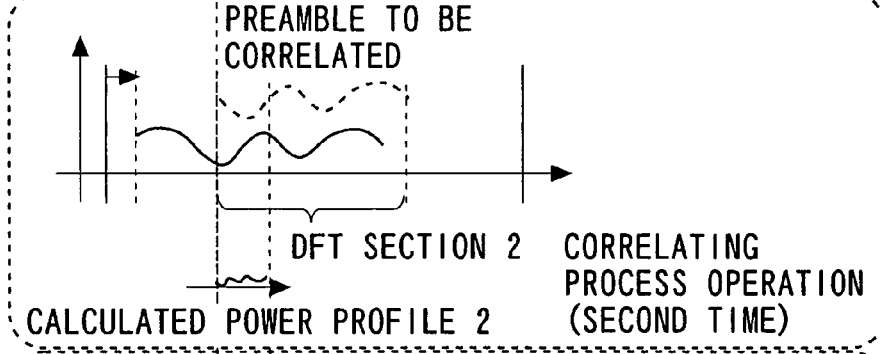
Figure 30E:
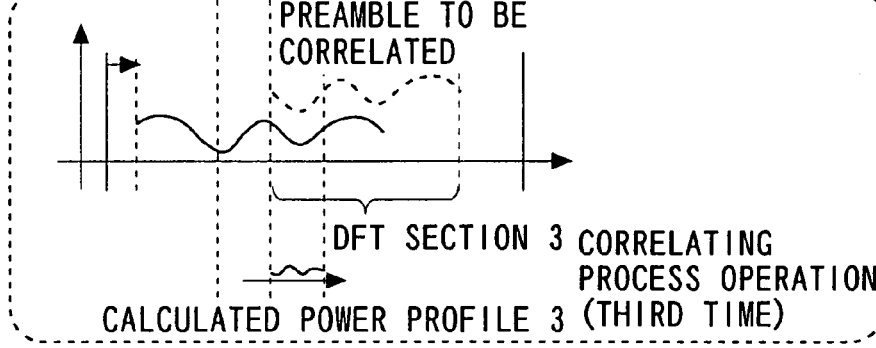

FIG. 29A is a diagram for representing an example of such a RACH signal waveform that "Cyclic Prefix" is carried out. FIG. 29B is a diagram for representing an example of such a RACH signal waveform that "Cyclic Postfix" is carried out.

The "Cyclic Prefix" corresponds to a system in which a portion of a rear side of the RACH signal waveform is copied, and then the copied portion is added to a front side thereof. In contrast thereto, "Cyclic Postfix" corresponds to a system in which a portion of the front side of the RACH signal waveform is copied, and then the copied portion is added to the rear side thereof. When the CP is added to the RACH signal, the resulting RACH signal becomes longer than the normal signal waveform obtained without employing the CP. As a result, a margin with respect to a delay is reduced. In other words, since the allowable delay amount is reduced, the cell radius must be designed as a small cell radius. It is known that the receiving characteristic may be improved.

<Second Preamble Receiving System>

Next, a description is made of a receiving process operation of a preamble having the format using the CP (namely, second preamble receiving system). In this case, explained is a system in which a receiving process operation is divided into a plurality of receiving process operations to be executed a plurality of times, while the overlap-and-add process operation is not performed.

FIG. 30 is an explanatory diagram for explaining the second preamble receiving system, and for showing such a condition that the reception signal having the format using the CP is processed. In the example shown in FIG. 30, in a transmission waveform (FIG. 30A), a CP waveform (CP portion) has been added in front of a signal (preamble) to be transmitted within a preamble section by employing 'Cyclic Prefix'.

Also, a margin section (guard time) is provided on the rear side of the preamble section. In this example, a length of the guard time becomes three times longer than a length of the CP. In this case, the receiving process operation (correlation processing operation) of the preamble is subdivided into 3 receiving process operations to be performed. A length of the margin section is made in an arbitrary size which is equal to or longer than the CP length. The number of correcting process operations is calculated by "margin section length/CP length" (remainder is defined as 1 time).

As shown in FIG. 30, the transmission waveform has contained a delay when this transmission signal is received by the receiving apparatus (reception waveform (FIG. 30B)). A section of the reception waveform which is employed in a correlating process operation of a first time (FIG. 30C) employs the preamble section of the original transmission format. The process operation itself for the correlation is similar to the correlating process operation as explained in the first embodiment. In other words, a preamble section (DFT section (1) of FIG. 30C) contained in the reception signal is cut out, and the cut preamble section is processed by DFT so as to be correlated with a replica signal, and thereafter, the correlated preamble section is processed by IDFT, so a first power profile (2) is obtained.

In a correlating process operation of a second time (FIG. 30D), a section having such a preamble section length that a position shifted backwardly from that of the correlating process operation of the first time by the CP length is defined as a starting point is processed by the correlating process operation as a DFT section (2), so a second power profile (2) is obtained.

In a correlating process operation of a third time (FIG. 30E), a section having such a preamble section length that a position shifted backwardly from the starting point of the DFT section (2) by the CP length is defined as a starting point is processed by the correlating process operation as a DFT section (3), so a third power profile (3) is obtained.

Figure 31:
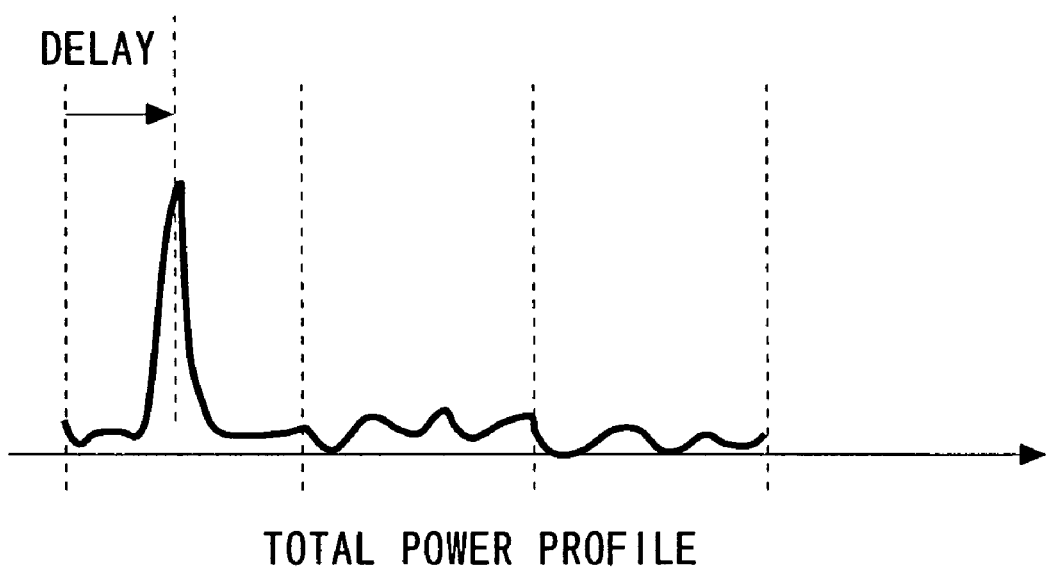
FIG. 31 is an explanatory diagram for explaining a synthesized power profile which is finally obtained by the second preamble receiving system.

Finally, the power profiles (1), (2), and (3) obtained in the respective correlating process operations are synthesized (coupled) to each other, so a coupled power profile is obtained (FIG. 31). A total delay time of the preamble having the CP may be calculated from a peak contained in the coupled power profile.

In accordance with the second preamble receiving system, the receiving process operation (demodulating process operation) is divided into the plurality of receiving process operations to be executed, thereby making it possible to improve the receiving characteristic without performing the overlap-and-add (OAA) process operation. In other words, it is possible to obtain the correlating process operation (power profile) in which the adverse influence caused by adding the noise in connection with the execution of the OAA process operation is avoided. In other words, the proper power profiles can be obtained, as compared with the power profiles obtained via the conventional OAA process operation.

<Arrangement of Receiving Apparatus>

Figure 32:
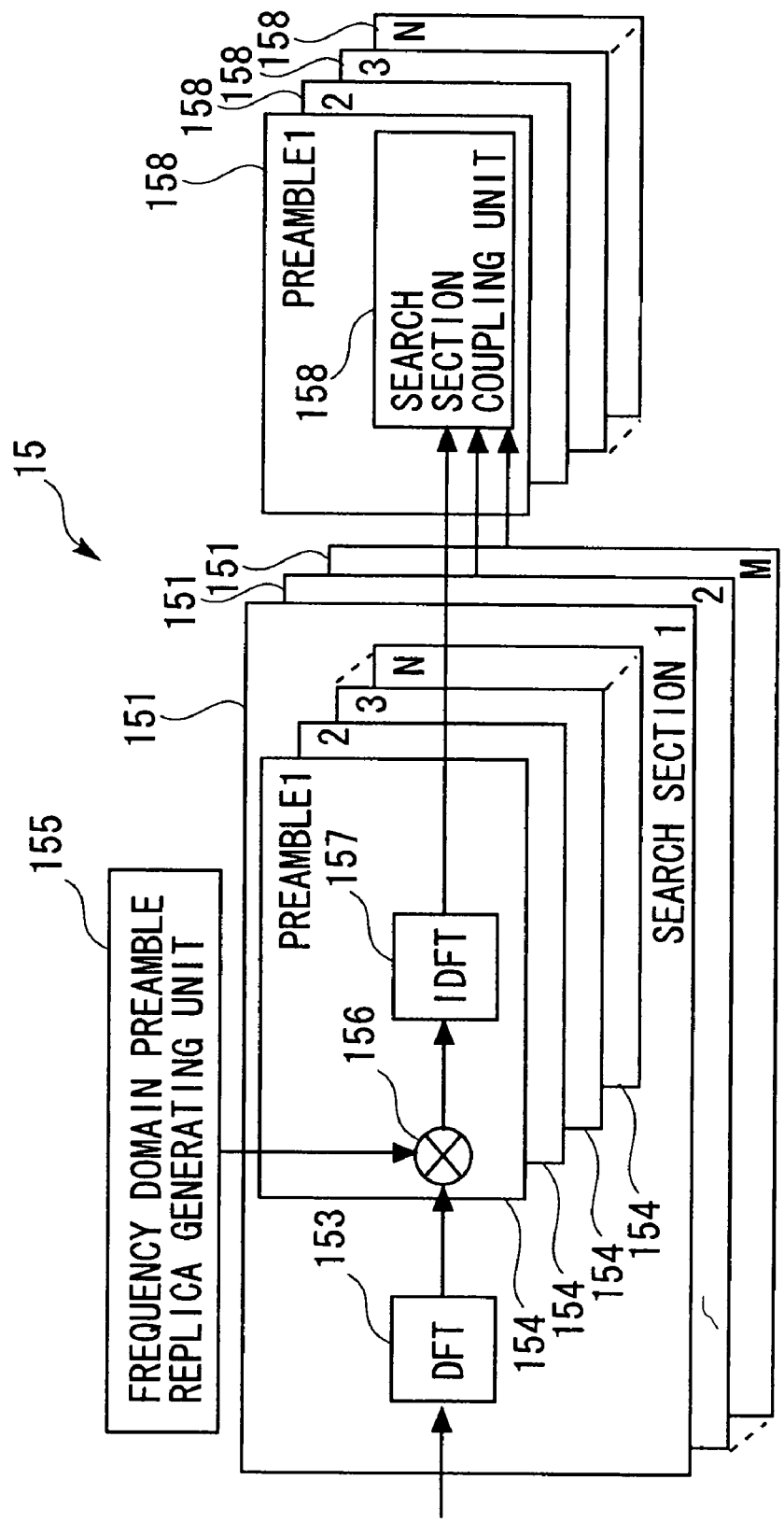
FIG. 32 is a diagram for showing a structural example of a correlation processing unit which can be applied to the second preamble receiving system.

As a preamble receiving apparatus to which the second preamble receiving system may be applied, the structures of the base station apparatuses shown in FIGS. 24 and 27 can be applied. It should be noted that as the correlation processing unit 15, a unit having the structure shown in FIG. 32 may be applied. FIG. 32 is a diagram for showing a structural example as to a correlation processing unit which is applied to the second preamble receiving system, and indicates a structure for performing a correlating process operation of the preamble equipped with the CP.

The correlation processing unit 15 shown in FIG. 32 is different from the correlation processing unit 15 (FIG. 26) which is applied to the first preamble receiving system in such a point that the OAA processing unit 152 is omitted from the power profile creating unit 151. The DFT unit 153 cuts out a DFT section corresponding thereto, and performs the DFT with respect to the cut DFT section. Except for the structures, both the structures and the functions of the correlation processing unit are the same as those of the first embodiment.

[Third Embodiment]

Next, a third embodiment of the present invention will now be explained. Since the third embodiment has a similar structure to that of the second embodiment, different points will be mainly described, and explanations as to common points are omitted.

Figure 33A:
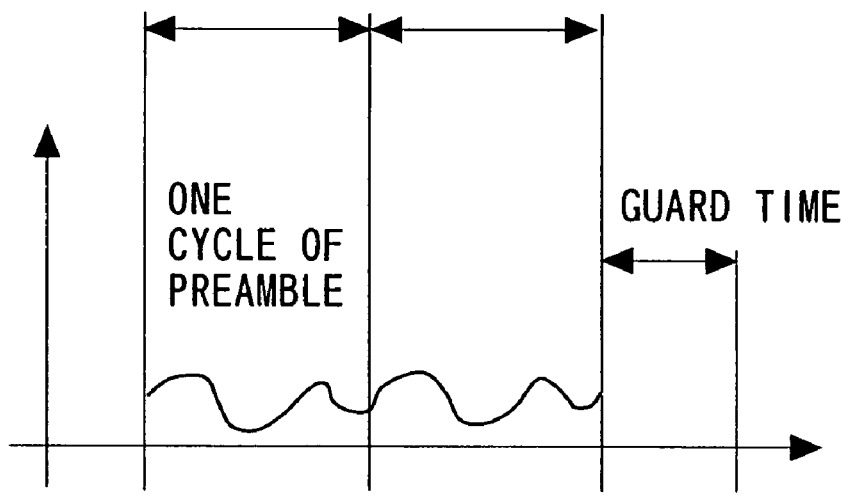
FIG. 33A is a diagram for showing a waveform (transmission waveform) of a frame containing a preamble having a repetition of a single series (single pattern) at the time of transmission by the terminal.
Figure 33B:
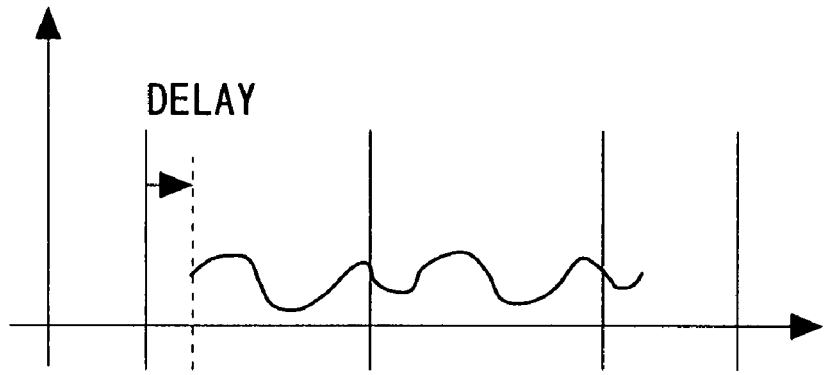
FIG. 33B is a diagram for showing a waveform (reception waveform) of the frame shown in FIG. 33A at the time of reception by the terminal.

In addition to the conventional format and the format attached with the CP, another format having a preamble in which a single pattern waveform is repeated a plurality of times has already been proposed (FIG. 33A). In the format example shown in FIG. 33A, preamble sections 1 and 2 are provided which are used to transmit such a preamble that a certain single pattern is repeated two times, and a margin section (guard time) is provided on the rear side of the preamble section. The preamble having such a format is received under such a condition that this preamble similarly has a delay on the reception side (FIG. 33B).

<Third Preamble Receiving System>

Figure 34:
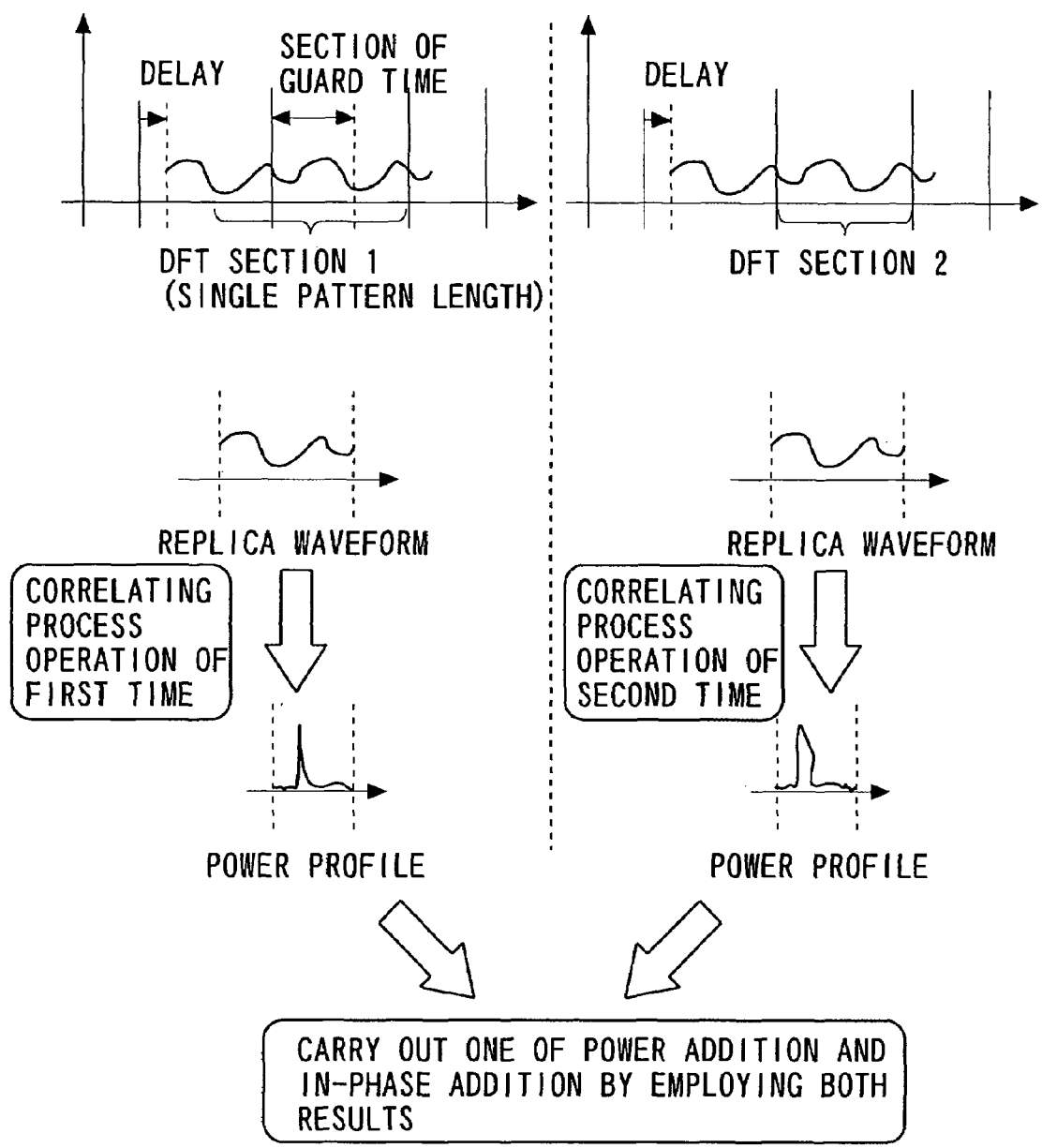
FIG. 34 is an explanatory diagram for explaining a third preamble receiving system (receiving process operation of a preamble having a repetition pattern)

Next, a description is made of a receiving system of a preamble having such a repetition pattern (namely, third preamble receiving system). FIG. 34 is an explanatory diagram for explaining an example of the third preamble receiving system.

In the example shown in FIG. 34, the preamble having the repetition pattern has such a format as shown in FIGS. 33A and 34B, and has a preamble in which the single pattern is repeated two times. In the third preamble receiving process operation, a plurality of correlating process operations are carried out, the total number of which is equal to the repetition time of the single pattern. In this example, the correlating process operation is carried out two times.

In FIG. 34, in a correlating process operation of a first time, such a section that a position advanced from a repetition starting position (staring point of a preamble section 2) of the single pattern to a rear side by a guard time length is defined as an end point, and another position returned from the end point to a front side by the single pattern length is cut out as a DFT section 1, and then the cut DFT section 1 is employed in the correlating process operation. That is, the section corresponds to such a section that a position shifted from a starting point of a preamble section 1 to the rear side by the guide time length is defined as the starting point, and another position advanced to the rear side by the single pattern length is defined as the end point. As a result of the correlating process operation, a first power profile is obtained.

In contrast thereto, in a correlating process operation of a second time, a section of the single pattern length which is overlapped with the DFT section 1 only by the guard time length is extracted as a second DFT section 2. In other words, a section (preamble section 2) of a rear half portion for one preamble period is cut out as the DFT section 2 which is used in the correlating process operation. As a result, a second power profile is obtained. Next, a synthesized power profile is created by synthesizing the first and second power profiles with each other. The synthesized power profile is created by one of <1> in-phase adding process operation, and <2> power adding process operation.

Figure 35A:
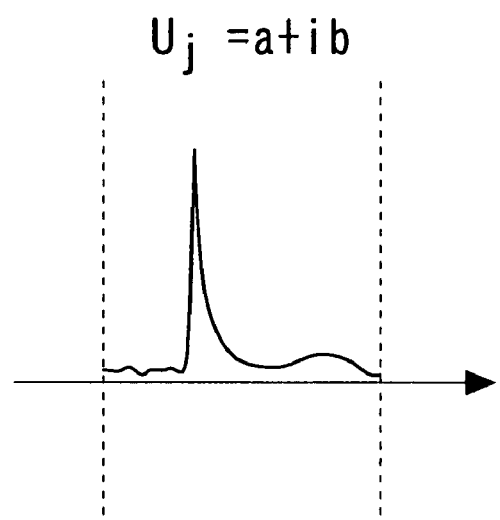
FIG. 35A is an explanatory diagram for explaining a power profile obtained in the correlating process operation of a first time in the receiving process operation shown in FIG. 34.
Figure 35B:
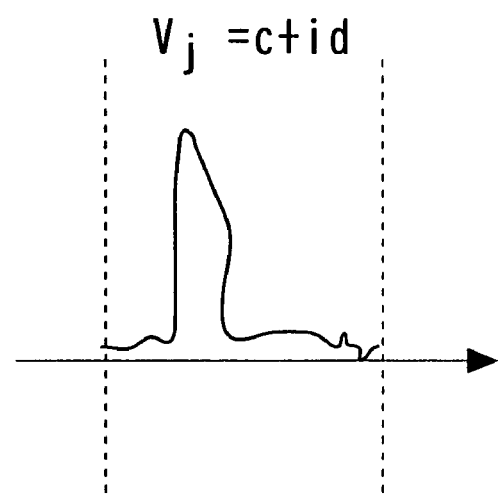
FIG. 35B is an explanatory diagram for explaining a power profile obtained in the correlating process operation of a second time in the receiving process operation shown in FIG. 34.

A description is made of the power adding process operation. The first and second power profiles are respectively defined as follows (FIGS. 35A and 35B):

$u_j=a+ib$ ((first)power profile of a first time)

$v_j=c+id$ ((second)power profile of a second time)

Figure 36:
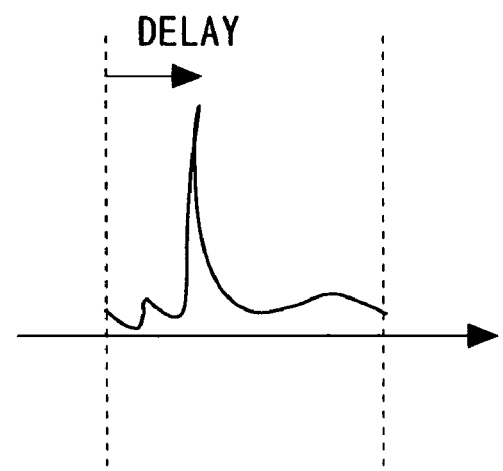
FIG. 36 is an explanatory diagram for explaining a synthesized power profile which is obtained by synthesizing the power profiles obtained in the respective correlating process operations by a power addition mode or in-phase addition mode.

It should be noted that symbol "j" indicates a sample number. When those two calculation results are synthesized with each other in accordance with the below-mentioned (formula 1), a synthesized power profile for adding the power to each other is obtained (FIG. 36).

$$\text{profile after power addition}=|a|^2+|b|^2+|c|^2+|d|^2 \quad \text{(formula 1)}$$

Since the synthesized power profile obtained in the manner can be obtained without executing the OAA, the synthesized power profile does not include the influence of the noise caused by the OAA. As a result, a proper power profile can be obtained, as compared with that obtained by executing the conventional OAA.

Next, a description is made of the in-phase adding process operation. Similar to the case of the power addition, two obtained results (power profiles) are respectively defined as follows:

$u_j=a+ib$ ((first)power profile of a first time)

$v_j=c+id$ ((second)power profile of a second time)

When those two calculation results are synthesized with each other in accordance with the below-mentioned (formula 2), a synthesized power profile for adding the power to each other in the in-phase mode is obtained.

$$\text{profile after in-phase addition}=(a+c)^2+(c+d)^2 \quad \text{(formula 2)}$$

The synthesized power profile obtained by the in-phase addition has a better characteristic, similar to that obtained by the power addition, as compared with that obtained by executing the OAA.

When a phase lag is small (when a moving speed is slow), the in-phase addition may have a better characteristic. When a phase lag is large (when a moving speed is fast), the power addition may have a better characteristic. In general, under such an environment that a moving speed is equal to or lower than 15 km/h, it is conceivable that if the in-phase addition is carried out, a power profile having a superior characteristic may be obtained.

Figure 37:
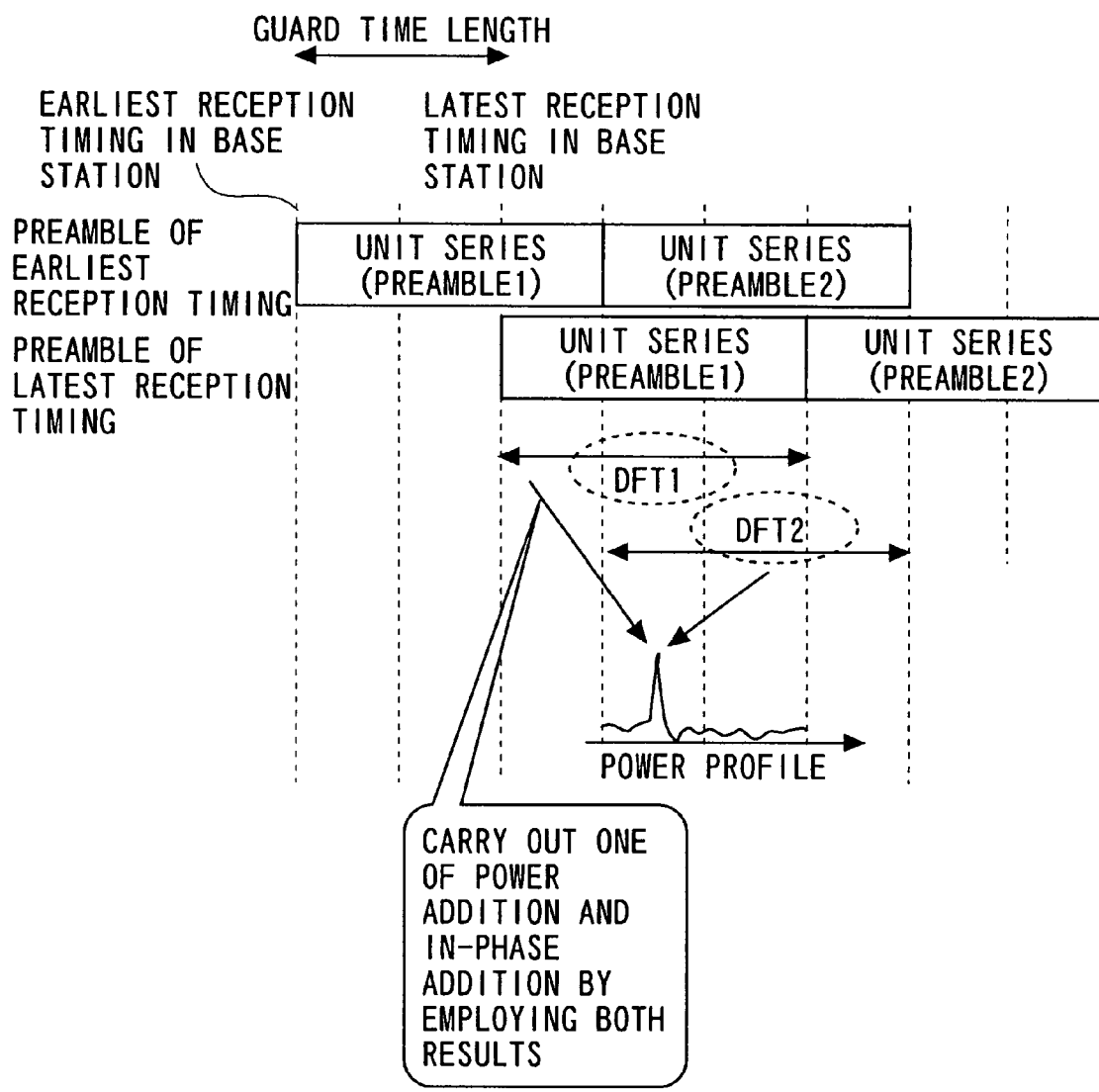
FIG. 37 is a diagram for showing a process operation example in a case where a search window (search section) is not divided in the third preamble receiving system.

FIG. 37 is a diagram for indicating an example of a receiving process operation as to a preamble having a repetition pattern, while a search window (search section) is not divided. The process shown in FIG. 37 is substantially the same as the receiving process operation shown in FIG. 34.

In FIG. 37, two unit series (preambles) described at a first stage from a top indicate preambles (preambles 1 and 2) which are received at the earliest timing for receiving the preambles in the base station (receiving apparatus), and two unit series (preambles) described at a second stage from the top indicate preambles (preambles 1 and 2) which are received at the latest timing for receiving the preambles in the base station (receiving apparatus). As described above, there is a difference of guard time lengths between the earliest reception timing and the latest reception timing.

While the difference (guard time lengths) is considered, in the base station, a section within such a range that a position shifted to the rear side from that of the earliest timing by the guard time length is defined as a starting point, and another position advanced to the rear side by a single series length is extracted as a DFT section 1, whereas a section having a single series length which is located on the rear side from the DFT section 1 and is overlapped with the DFT section 1 by the guard time length is extracted as a DFT section 2, and then a correlating process operation is carried out as to each of the DFT sections 1 and 2. Then, power profiles as to the DFT sections 1 and 2 are created, and either a power addition or an in-phase addition is carried out, so a synthesized power profile is created.

Figure 38:
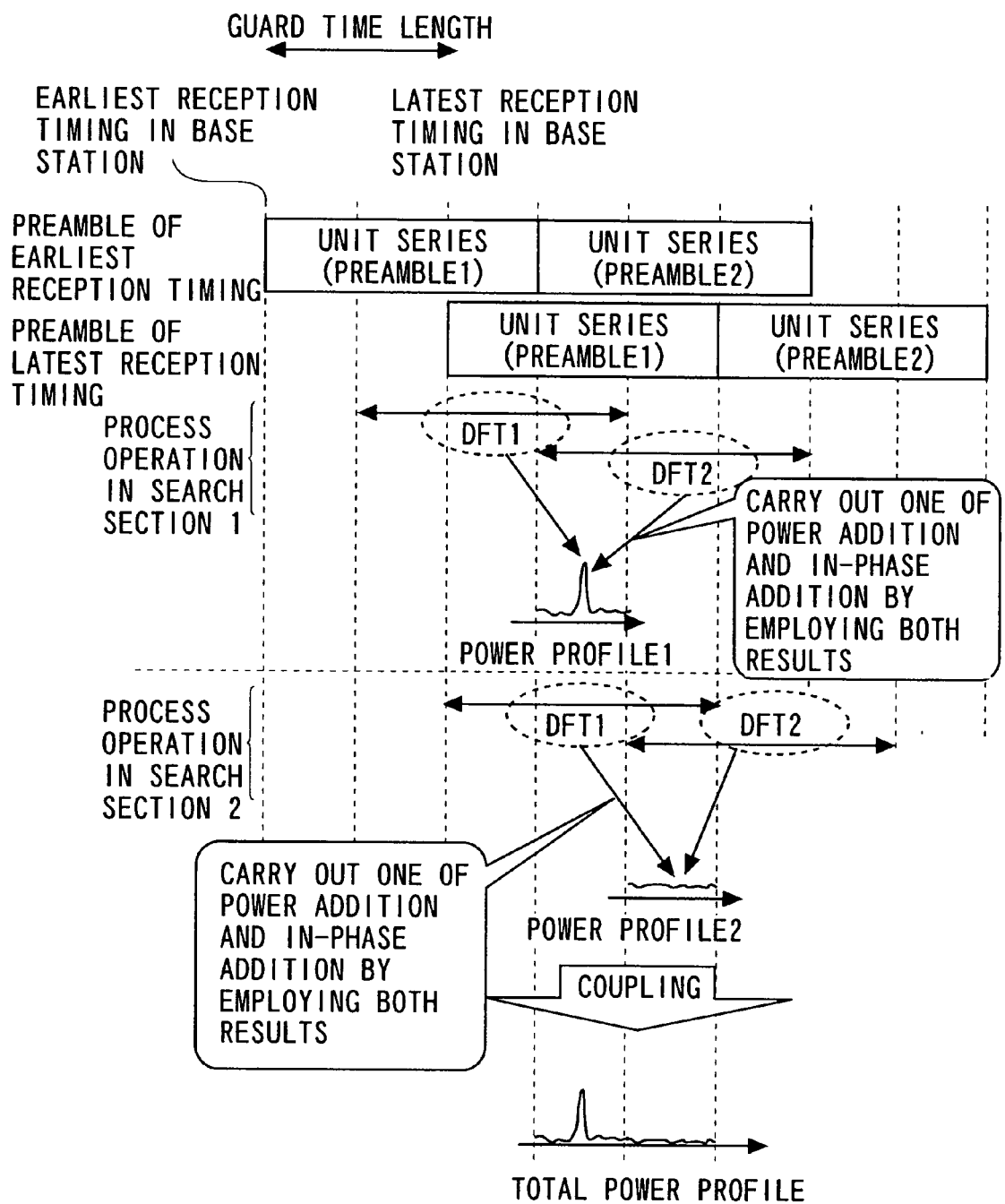
FIG. 38 is a diagram for showing a process operation example in a case where a search window (search section) is divided into two sections in the third preamble receiving system.

In the third preamble receiving system, the search section (guard time) is divided into a plurality of sections, and as to each of the divided sections, such a process operation as shown in FIG. 37 can be carried out. FIG. 38 indicates a process operation performed when the search section (search window) is divided by 2, and FIG. 39 indicates a process operation performed when the search section (search window) is divided by 3.

In FIG. 38, the guard time (search section) is equally divided by 2, and the respective divided sections are defined as search sections 1 and 2. In this case, a DFT section 1 related to the search section 1 constitutes such a section that a position which is advanced from the starting point of the preamble section 2 to the rear side by ½ of the guard time length is defined as an end point, and another position which is returned to the front side by the single pattern (unit series) length is defined as a starting point. That is, the DFT section 1 corresponds to such a section that a position which is shifted to the rear side from the earliest reception timing by the ½ of the guard time length is defined as the starting point, and another position which is advanced from the starting point to the rear side by the single series length is defined as the end point. On the other hand, the DFT section 2 constitutes a section similar to the preamble section 2. A synthesized power profile obtained by the process becomes a power profile with respect to the front half portion of the entire search section.

On the other hand, DFT sections 1 and 2 in the search section 2 constitute sections which are delayed by the ½ of the guard time length as compared with the DFT sections 1 and 2 of the search section 1. A synthesized power profile related to such a search section 2 becomes a power profile of a rear half portion within the entire search section. These synthesized power profiles are coupled to each other, so a total synthesized power profile is created.

Figure 39:
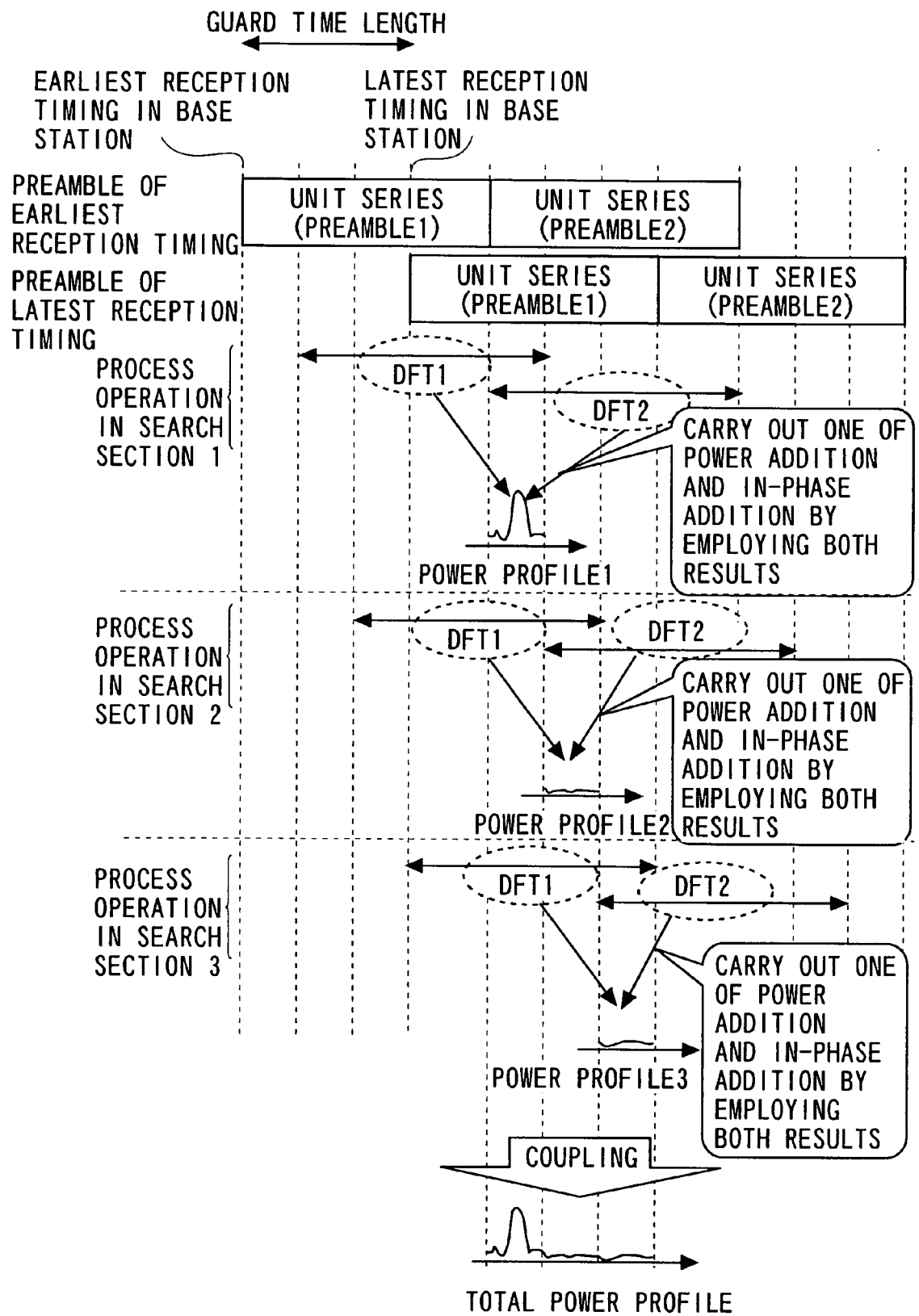
FIG. 39 is a diagram for showing a process operation example in a case where a search window (search section) is divided into three sections in the third preamble receiving system.

In FIG. 39, the guard time (search section) is equally divided by 3, and the respective divided sections are defined as search sections 1, 2, and 3. In this case, a DFT section 1 related to the search section 1 constitutes such a section that a position which is advanced from the starting point of the preamble section 2 to the rear side by ⅓ of the guard time length is defined as an end point, and another position which is returned to the front side by the single pattern (unit series) length is defined as a starting point. That is, the DFT section 1 corresponds to such a section that a position which is delayed from the starting point of the preamble section 1 by the ⅓ of the guard time length is defined as the starting point, and another position which is delayed from the starting point by the single series length is defined as the end point. On the other hand, the DFT section 2 constitutes a section similar to the preamble section 2. DFT sections 1 and 2 in the search sections 2 and 3 constitute sections which are delayed from the DFT sections 1 and 2 in a search section, which precedes by one section, by the ⅓ of the guard time length, respectively. Power profiles with respect to the search sections (divided sections) 1, 2, and 3 are created. Then, those synthesized power profiles are coupled to each other, so a total synthesized power profile is created.

As described above, the search section is divided into a plurality of divided sections, so the receiving characteristic can also be improved.

The above description is made of a case of the repetition of the single pattern multiplied by an integer. Also, when a length of a CP is longer than a search section, a signal to which the CP is added corresponds to a partial repetition of the single pattern, so the signal may be processed in a similar process method.

<Arrangement of Receiving Apparatus>

As a preamble receiving apparatus to which the third preamble receiving system may be applied, the structures of the base station apparatuses shown in FIGS. 24 and 27 can be applied. It should be noted that as the correlation processing unit 15, a unit having the structure shown in FIG. 40 may be applied.

Figure 40:
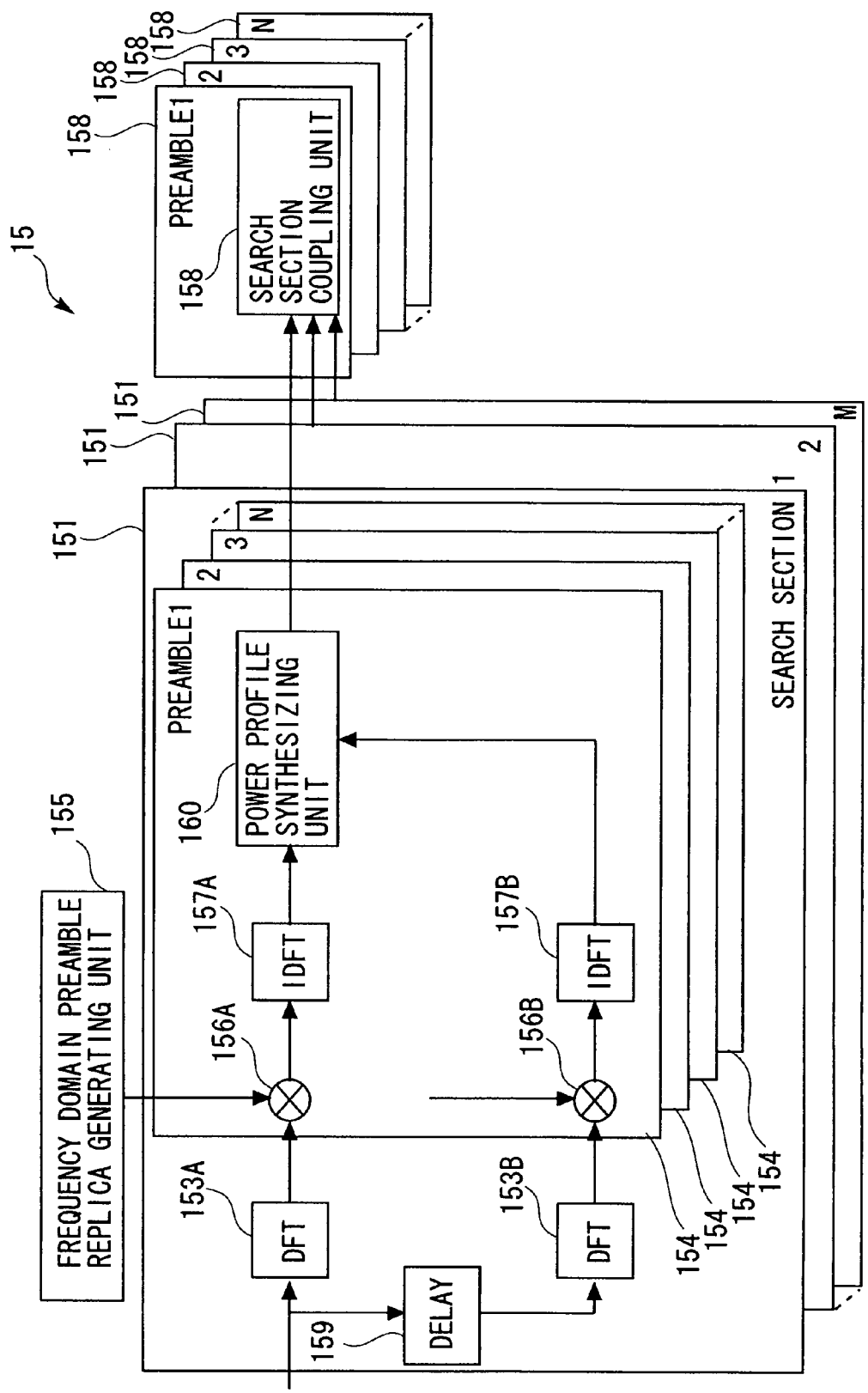
FIG. 40 is a diagram for showing a structural example of a correlation processing unit which can be applied to the third preamble receiving system.

FIG. 40 is a diagram for showing a structural example as to a correlation processing unit which is applied to the third preamble receiving system, and indicates a structure for performing a correlating process operation of a preamble having a repetition pattern. The correlation processing unit 15 shown in FIG. 40 is different from the correlation processing unit 15 (FIG. 26) of the first embodiment in the below-mentioned point.

That is, the OAA processing unit 152 is omitted from each of the power profile creating units 151. Also, each of the correlation calculating units 154 has a power profile synthesizing unit 160. Two series of DFT units, multipliers, and IDFT units are provided (namely, DFT units 153A and 153B, multipliers 156A and 156B, and IDFT units 157A and 157B). One correlation processing series (153A, 156A, and 157A) performs a correlating process operation with respect to the DFT section 1, whereas the other correlation processing series (153B, 156B, and 157B) performs a correlating process operation with respect to the DFT section 2. In order to prevent inputs to the power profile synthesizing unit 160 from competing with each other, a delay unit 159 is provided, so the power profile of the DFT section 2 is delayed to be entered to the power profile synthesizing unit 160, as compared with the power profile of the DFT section 1. The same replica signals (replica waveforms) are inputted from a replica generating (creating) unit 155 to the respective multipliers 156A and 156B.

The power profile synthesizing unit 160 couples the power profile of the DFT section 1 to the power profile of the DFT section 2 in accordance with, for instance, a predetermined adding method (one of power addition and in-phase addition), and then outputs the resulting coupled power profile.

The structure shown in FIG. 40 contains an arrangement which is employed by supposing such a case that the search section as shown in FIGS. 38 and 39 is divided into a plurality of divided sections. As a result, while the power profile creating unit 151 is provided with respect to each of search sections (divided sections) 1 to N, power profiles of the respective divided sections are outputted as a synthesized power profile by being coupled to each other in a search section coupling unit 158. The third preamble receiving system (FIGS. 34 and 37) in which the search section is not divided can be realized by providing only one of the power profile creating units 151 contained in the structure shown in FIG. 40.

In the first to third embodiments, since the IDFT size used in the IDFT unit 157 is increased, time resolution of a profile may be alternatively improved. Also, as a process operation for returning a frequency domain to a time domain, since an IFFT (inverse fast Fourier transform) is employed instead of the IDFT, a circuit scale may be alternatively reduced.

[Others]

The above-mentioned embodiments disclose claimed inventions. The respective claimed inventions may be properly combined with each other, if required.

The disclosures of Japanese patent application No. JP2006-246049 filed on Sep. 11, 2006 including the specification, drawings and abstract are incorporated herein by reference.

What is claimed is:

1. A preamble receiving apparatus, comprising:
a receiving unit receiving from a transmitting apparatus a frame having a format which contains a preamble section and a margin section subsequent to the preamble section; and
a reception processing unit detecting a preamble signal which is transmitted in the preamble section in the transmitting apparatus from the frame received by the receiving unit, wherein the reception processing unit includes:
a correlation processing unit which defines, as a search section, a time having a predetermined starting point and which is equal to or shorter than the margin section, performs a correlating process operation related to a plurality of divided sections obtained by dividing the search section, the correlating process operation including calculating a correlation between the preamble signal and a known replica signal thereof, and creates a power profile for each of the plurality of divided sections; and
a creating unit creating a coupled power profile by coupling the power profile for each of the divided sections to each other, and
wherein the preamble signal is a random access preamble signal transmitted from a mobile terminal to a base station when the mobile terminal performs a random access to the base station.

2. The preamble receiving apparatus according to claim 1, wherein the correlation processing unit extracts a predetermined section of a time domain to be employed in the correlating process operation from the frame, converts the predetermined section into a frequency domain, performs the correlating process operation to the frequency domain, and again converts the frequency domain into the time domain to obtain the power profile.

3. The preamble receiving apparatus according to claim 2, wherein an inverse discrete Fourier transform is employed in the process operation for converting the frequency domain into the time domain.

4. The preamble receiving apparatus according to claim 1, wherein the reception processing unit performs the correlating process operation after an overlap-and-add process operation of the divided section with respect to the section which is employed in the correlating process operation within the frame.

5. The preamble receiving apparatus according to claim 1, wherein:
a CP portion formed of a cyclic prefix or a cyclic postfix is added to the preamble signal;
the CP portion has a length shorter than the search section;
the search section is divided into the plurality of divided sections in consideration of the length of the CP portion; and
the correlation processing unit performs the correlating process operation for each of the divided sections.

6. The preamble receiving apparatus according to claim 1, wherein:
the preamble signal is composed of a repetition of a single pattern or is added with a CP portion composed of a cyclic prefix or a cyclic postfix, the CP portion having a length longer than the search section;
the correlation processing unit performs, for each of the divided sections, the correlating process operation with respect to a first section and a second section contained in the frame to create a first power profile and a second power profile, and creates a synthesized power profile by synthesizing the first power profile and the second power profile;
the first section corresponds to a section having a position at which a timing is delayed by a length of the divided section from an earliest reception timing of the preamble signal within the frame as a starting point, and another position at which the timing is delayed from the starting point by a length of the single pattern as an end point;
the second section corresponds to a section having a starting point delayed from the starting point of the first section and having the same length as that of the first section, and the second section is overlapped with the first section by the length of the divided section; and
the creating unit creates the coupled power profile by coupling the synthesized power profile for each of the divided sections.

7. The preamble receiving apparatus according to claim 6, wherein the correlation processing unit creates a synthesized power profile by adding the first power profile to the second power profile in a power addition mode.

8. The preamble receiving apparatus according to claim 6, wherein the correlation processing unit creates a synthesized power profile by adding the first power profile to the second power profile in an in-phase addition mode.

9. The preamble receiving apparatus according to claim 1, wherein the frame is a random access channel subframe.

10. A preamble receiving apparatus, comprising:
a receiving unit receiving from a transmitting apparatus a frame having a format which contains a preamble section and a margin section subsequent to the preamble section; and
a reception processing unit detecting a preamble signal which is transmitted in the preamble section in the transmitting apparatus from the frame received by the receiving unit, the preamble signal being formed of a repetition of a single pattern or being added with a CP portion composed of a cyclic prefix or a cyclic postfix which is longer than the search section, wherein the reception processing unit includes:

a correlation processing unit performing a correlating process operation with respect to a first section and a second section within the frame, the correlating process operation including calculating a correlation between the preamble signal and a known replica signal thereof, and creating power profiles related to the first section and the second section; and a synthesizing unit creating a synthesized power profile by synthesizing the power profiles related to the first section and the second section;

the first section corresponds to a section having a position at which a timing is delayed by a length of the search section from an earliest reception timing of the preamble signal within the frame as a starting point, and another position at which the timing is delayed from the starting point by a length of the single pattern as an end point;

the second section corresponds to a section having a starting point delayed from the starting point of the first section, and having the same length as that of the first section, and is also overlapped with the first section by the length of the search section, and wherein the preamble signal is a random access preamble signal transmitted from a mobile terminal to a base station when the mobile terminal performs a random access to the base station.

11. The preamble receiving apparatus according to claim 10, wherein the correlation processing unit converts the first section and the second section of a time domain from the frame into frequency domains to perform the correlating process operation for the converted frequency domains, and again converts the correlated frequency domains into the time domain to obtain the power profiles related to the first section and the second section.

12. The preamble receiving apparatus according to claim 10, wherein the correlation processing unit creates a synthesized power profile by adding the power profile related to the first section to the power profile related to the second section in a power addition mode.

13. The preamble receiving apparatus according to claim 10, wherein the correlation processing unit creates a synthesized power profile by adding the power profile related to the first section to the power profile related to the second section in an in-phase addition mode.

14. A preamble reception processing method for a preamble receiving apparatus including a receiving unit receiving from a transmitting apparatus a frame having a format which contains a preamble section and a margin section subsequent to the preamble section, and a reception processing unit detecting a preamble signal which is transmitted in the preamble section in the transmitting apparatus from the frame received by the receiving unit, the preamble reception processing method comprising:

defining, by the reception processing unit, a time having a predetermined starting point and which is equal to or shorter than the margin section as a search section;

performing, by the reception processing unit, a correlating process operation of the preamble signal related to a plurality of divided sections obtained by dividing the search section, the correlating process operation including calculating a correlation between the preamble signal and a known replica signal thereof, and creating a power profile for each of divided sections; creating, by the reception processing unit, a coupled power profile by coupling the power profile for each of the divided sections to each other; and detecting, by the reception processing unit, the preamble signal from the coupled power profile wherein the preamble signal is a random access preamble signal transmitted from a mobile terminal to a base station when the mobile terminal performs a random access to the base station.

15. The preamble reception processing method according to claim 14, wherein the reception processing unit performs the correlating process operation after an overlap-and-add process operation of the divided section with respect to the section which is employed in the correlating process operation within the frame.

16. The preamble reception processing method according to claim 14, wherein:

a CP portion composed of a cyclic prefix or a cyclic postfix is added to the preamble signal;

the CP portion has a length shorter than the search section;

the search section is divided into the plurality of divided sections in consideration of the length of the CP portion; and the correlating process operation is performed for each of the divided sections.

17. The preamble reception processing method according to claim 14, wherein the preamble signal is formed of a repetition of a single pattern or is added with a CP portion composed of a cyclic prefix or a cyclic postfix, the CP portion having a length longer than the search section, the preamble reception processing method further including:

performing, by the reception processing unit, the correlating process operation with respect to a first section and a second section contained in the frame for each of the divided sections to create a first power profile and a second power profile;

creating, by the reception processing unit, a synthesized power profile by synthesizing the first power profile and the second power profile, wherein the first section corresponds to a section having a position at which a timing is delayed by a length of the divided section from an earliest reception timing of the preamble signal as a starting point, and another position at which the timing is delayed from the starting point by a length of the single pattern as an end point, wherein the second section corresponds to a section having a starting point delayed from the starting point of the first section and having the same length as that of the first section, and the second section is overlapped with the first section by the length of the divided section; and creating, by the reception processing unit, the coupled power profile by coupling the synthesized power profile for each of the divided sections.

18. A preamble reception processing method for a preamble receiving apparatus including a receiving unit receiving from a transmitting apparatus a frame having a format which contains a preamble section and a margin section subsequent to the preamble section, and a reception processing unit detecting a preamble signal which is transmitted in the preamble section in the transmitting apparatus from the frame received by the receiving unit, the preamble signal being formed of a repetition of a single pattern and being added with a CP portion composed of a cyclic prefix or a cyclic postfix which is longer than the search section, the preamble reception processing method comprising:

creating, by the reception processing unit, power profiles related to a first section and a second section through a correlating process operation with respect to the first section and the second section within the received frame, the correlating process operation including calculating a correlation between the preamble signal and a known replica signal thereof;

creating, by the reception processing unit, a synthesized power profile by synthesizing the power profiles with respect to the first section and the second section; and detecting, by the reception processing unit, the preamble signal from the synthesized power profile, wherein the first section corresponds to a section having a position at which a timing is delayed by a length of the search section from an earliest reception timing of the preamble signal within the frame as a starting point, and another position at which the timing is delayed from the starting point by a length of the single pattern as an end point, and wherein the second section corresponds to a section having a starting point delayed from the starting point of the first section and having the same length as that of the first section, and the second section is overlapped with the first section by the length of the search section, and wherein the preamble signal is a random access preamble signal transmitted from a mobile terminal to a base station when the mobile terminal performs a random access to the base station.

* * * * *